United States Patent
Yang

(10) Patent No.: US 7,447,117 B2
(45) Date of Patent: Nov. 4, 2008

(54) CORRELATION BASED DECISION-FEEDBACK EQUALIZER FOR UNDERWATER ACOUSTIC COMMUNICATIONS

(75) Inventor: Tsih C. Yang, Falls Church, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 350 days.

(21) Appl. No.: 11/165,292

(22) Filed: Jun. 24, 2005

(65) Prior Publication Data

US 2007/0071077 A1 Mar. 29, 2007

Related U.S. Application Data

(60) Provisional application No. 60/582,727, filed on Jun. 24, 2004.

(51) Int. Cl.
H04B 11/00 (2006.01)
(52) U.S. Cl. ........................................ 367/134
(58) Field of Classification Search ................ 367/134; 375/218
See application file for complete search history.

(56) References Cited

U.S. PATENT DOCUMENTS

| | | | | | |
|---|---|---|---|---|---|
| 5,239,560 | A | * | 8/1993 | Daniel | 375/260 |
| 5,301,167 | A | * | 4/1994 | Proakis et al. | 367/134 |
| 5,412,620 | A | * | 5/1995 | Cafarella et al. | 367/134 |
| 6,512,720 | B1 | * | 1/2003 | Yang | 367/134 |
| 6,687,188 | B2 | * | 2/2004 | Yang | 367/134 |
| 7,218,574 | B2 | * | 5/2007 | Green | 367/134 |
| 2003/0214881 | A1 | * | 11/2003 | Yang | 367/134 |
| 2005/0111588 | A1 | * | 5/2005 | Green | 367/6 |
| 2007/0071077 | A1 | * | 3/2007 | Yang | 375/218 |

OTHER PUBLICATIONS

M. Stojanovic, J. Catipovic and J. G. Proakis , "Adaptive multichananel combining and equalization for underwater acoustic communications," J. Acoust. Soc. Am. 94 (3), 1621-1632 (1993).

J. Labat and C. Laot, "Blind adaptive multiple-input decision-feedback equalizer with a self-optimized configuration," IEEE Trans. Comm. vol. 49, No. 4, 646-654 (2001).

M. Stojanovic, L. Freitag and M. Johnson, "Channel-estimation-based adaptive equalization of underwater acoustic signals," IEEE Oceans'99 vol. 1, 590-595, Seattle WA (1999).

(Continued)

Primary Examiner—Dan Pihulic
(74) Attorney, Agent, or Firm—John J. Karasek; L. George Legg

(57) ABSTRACT

An underwater communications system includes an antenna array, a sound transmission source for transmitting communication packets, and a receiver including a processor. The processor is programmed for receiving and detecting a Doppler-sensitive probe signal and training sequence, for estimating a channel impulse response function for correlating the received signal to yield a plurality of processed channel outputs, and for summing the channel outputs to yield a common receiver output. The common receiver output is applied to a Decision Feedback Equalizer (DFE) for adaptive correction of the inter-symbol interference and to retrieve the transmitted communication message.

10 Claims, 27 Drawing Sheets

OTHER PUBLICATIONS

E. M. Sozer, J. G. Proakis, and F. Blackmon, "Iterative equalization and decoding techniques for shallow water acoustic channels," IEEE Oceans 2001 vol. 4, 2201-2208 (2001).

M. Stojanovic, J. Catipovic and J. G. Proakis, "Reduced-complexity spatial and temporal processing of underwater acoustic communication signals," J. Acoust. Soc. Am. 98 (2), 961-972 (1995).

J. Edelmann et al, "An initial demonstration of underwater acoustic communication using time reversal," IEEE J. Oceanic Eng. 27, 602-609 (2002).

D. Rouseff et al, "Underwater acoustic communication by passive-phase conjugation: Theory and experimental results," IEEE J. Oceanic Eng. 26, 821-831 (2001).

* cited by examiner

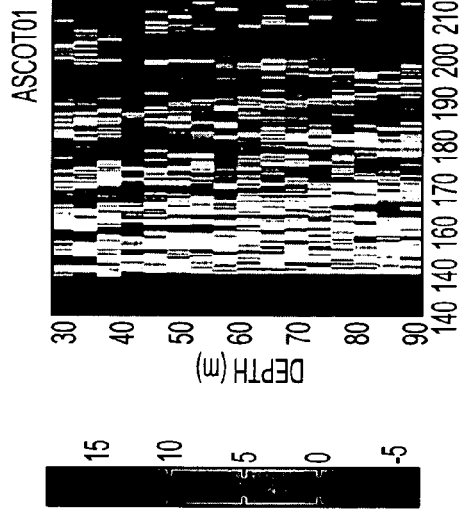
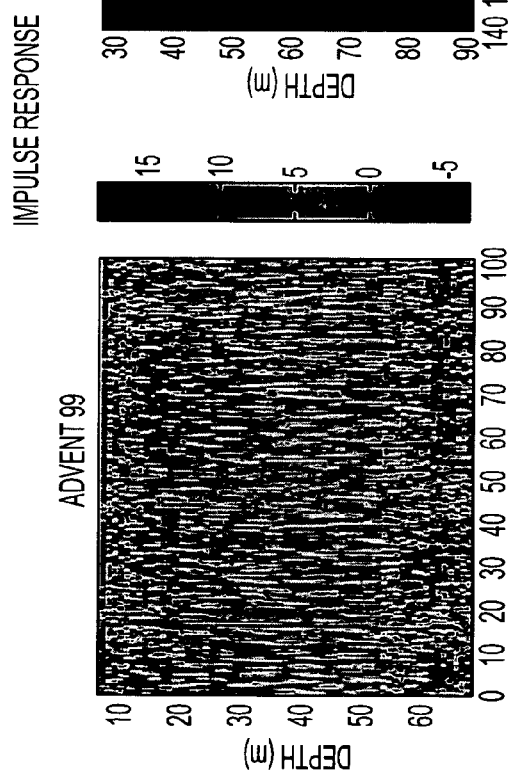
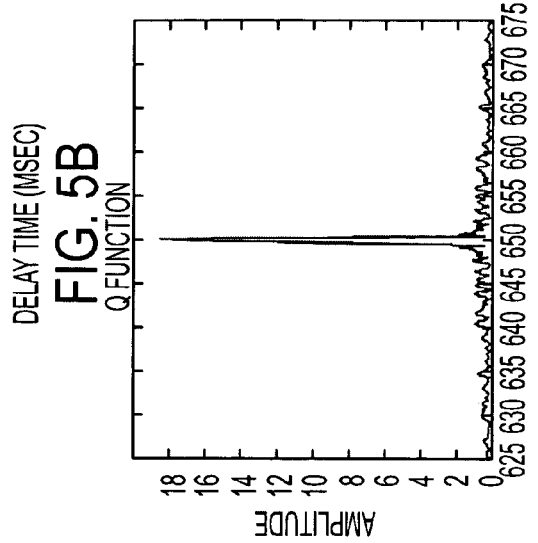
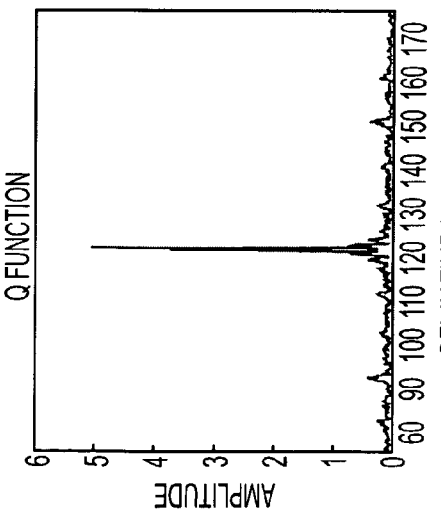
FIG. 5A
FIG. 5B
FIG. 5C
FIG. 5D

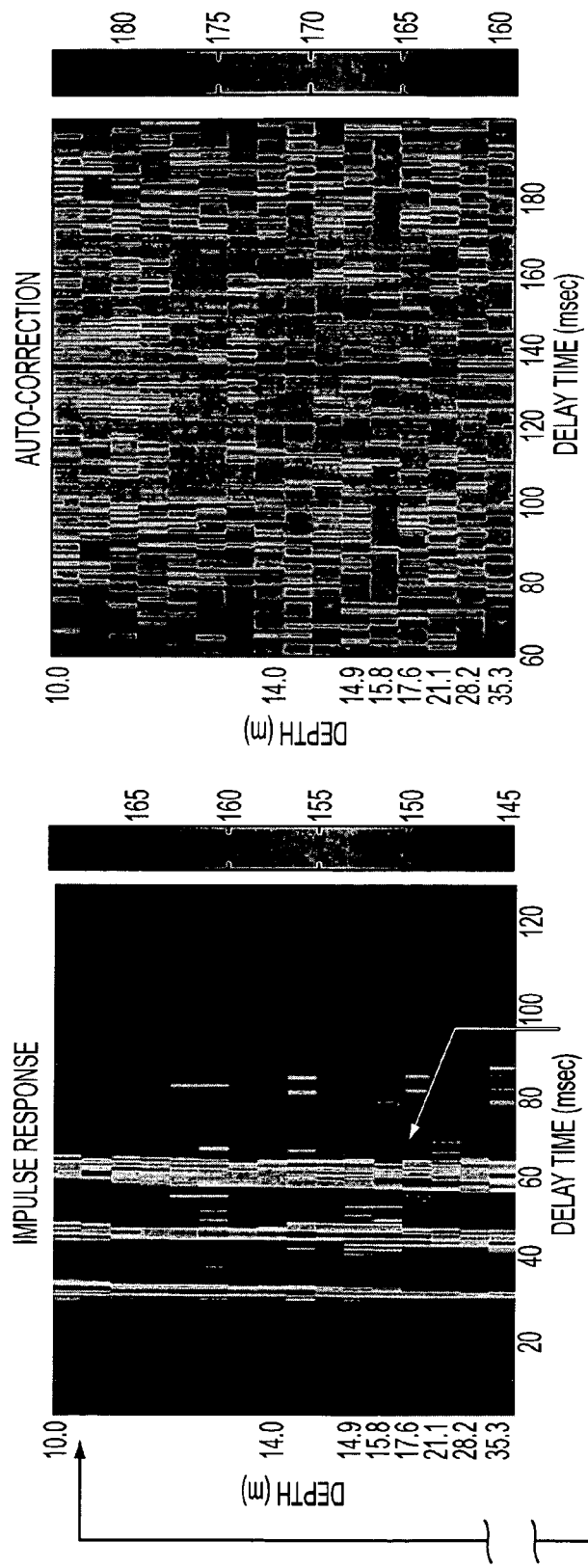
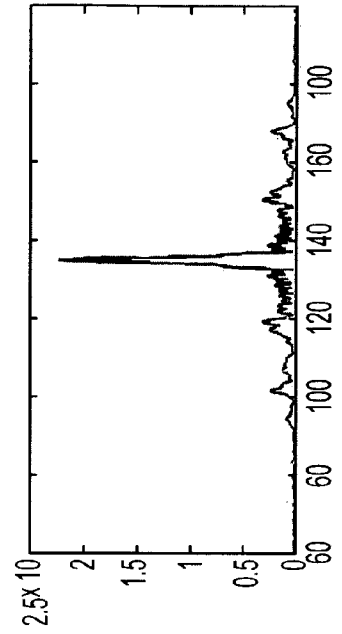
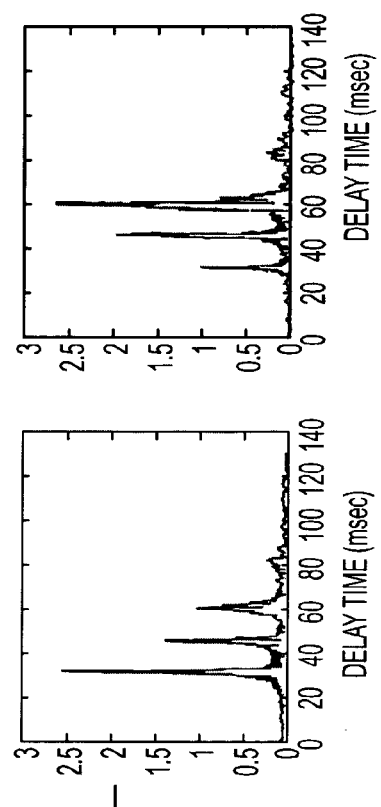
FIG. 8A
FIG. 8B
FIG. 8C
FIG. 8D
FIG. 8E

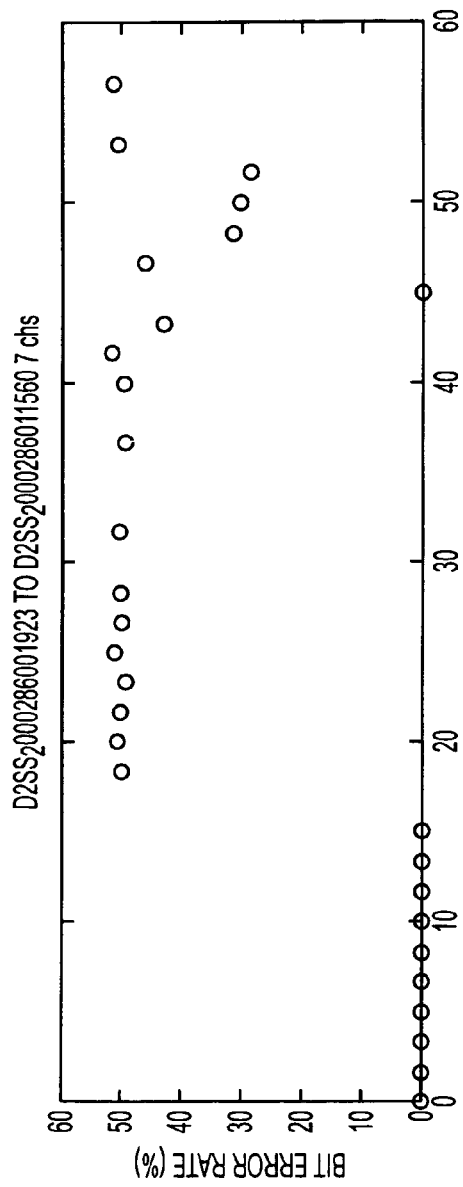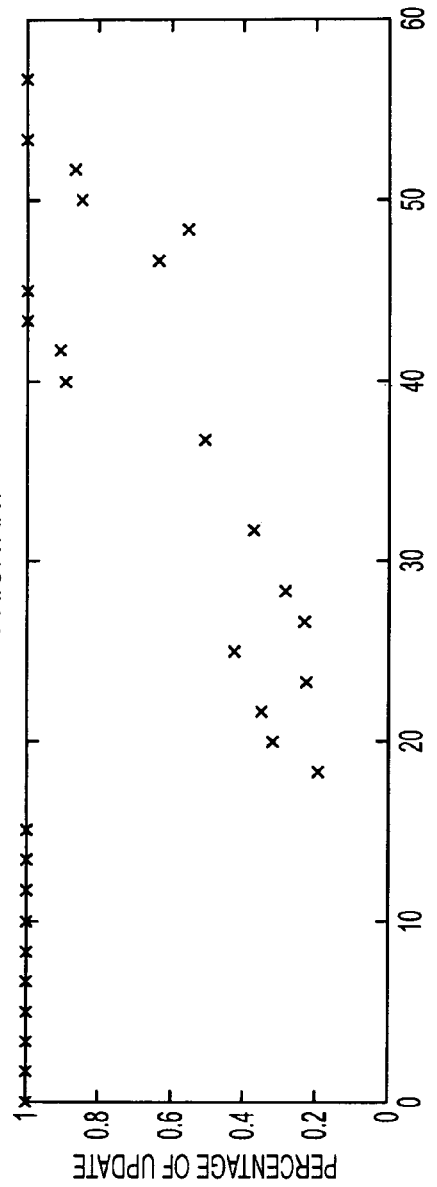
FIG. 18A PRIOR ART
FIG. 18B PRIOR ART

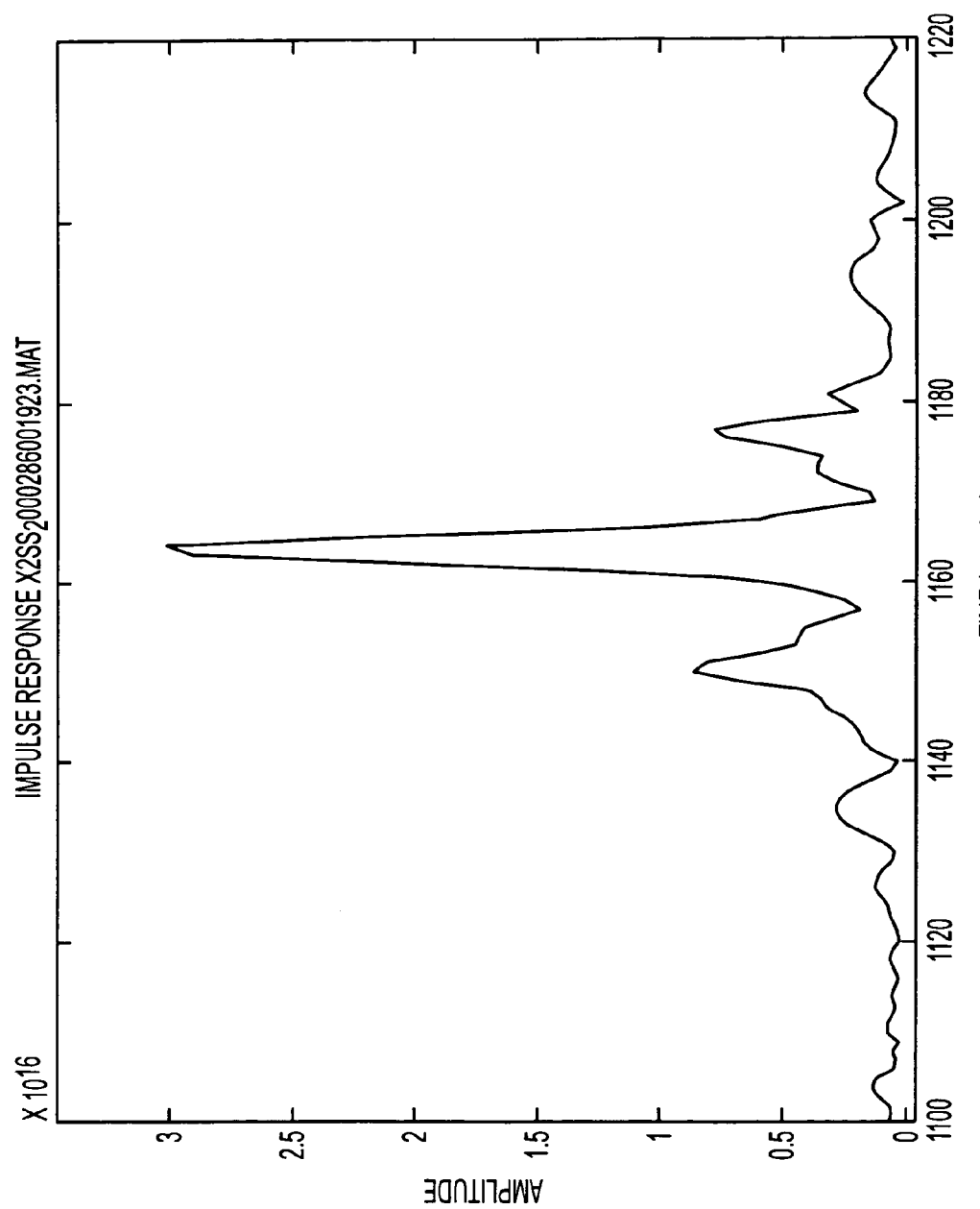

CORRELATION BASED DECISION-FEEDBACK EQUALIZER FOR UNDERWATER ACOUSTIC COMMUNICATIONS

The present application claims the benefit of the priority filing date of provisional patent application No. 60/582,727, filed Jun. 24, 2004, incorporated herein by reference.

FIELD OF THE INVENTION

This invention relates to a method and device for underwater acoustic communications. More particularly, the invention relates to underwater acoustic communications using correlation-based decision-feedback equalizing.

BACKGROUND OF THE INVENTION

Phase coherent communications provide a higher spectral efficiency (higher data rate for a given bandwidth) than phase incoherent communications and are particularly useful for acoustic communications in a band-limited underwater acoustic channel. The problem is inter-symbol interference (ISI) caused by long multipath delays associated with sound propagation in the underwater channel. As in RF communications, ISI can be removed by channel equalization. Another method is to use time-reversal and/or passive-phase conjugation technique when a vertical array of sources/receivers is available.

One such approach, described in "Adaptive multichannel combining and equalization for underwater acoustic communications," M. Stojanovic, J. Catipovic and J. G. Proakis, *J. Acoust. Soc. Am.* 94 (3), 1621-1632 (1993), employs a multichannel adaptive channel decision feedback equalizer (DFE) in combination with a phase locked loop (PLL). The problem, however, is the reliability of the equalizer in terms of bit error rate (BER) over a large number of packets. Often, in an unsupervised mode, only fractions of the packets are error-free (before error decoding). The reliability gets worse when the source or receiver has motion. One finds that the BER can in many cases be reduced in post-processing by adjusting the parameters in the signal processor. The hope is then to improve the performance by better channel estimation and tracking. As a result, extensive efforts have been devoted to measure the channel impulse responses and relate that to the BER. However, no performance metrics has been found to this date that clearly correlates the performance with the environmental parameters or signal processing parameters. The less than robust performance of the equalizer has thus far prevented unsupervised (or commercial) adaptation of the algorithm in real communication systems.

The performance of coherent acoustic communication systems depends upon channel characteristics that include multipath, spatial and temporal coherence, Doppler effects and ambient noise, effects that exhibit temporal change dependent on local environmental conditions, the amount of movement of the source and receiver platforms and the beam patterns of the sonar transducers. Accordingly, there has been no effective method for predicting the environmental changes and to mitigate against their effects. One finds experimentally while some packets are error free, others in adjacent time periods sometimes have large errors, even when the gross properties of the acoustic channel haven't changed much.

From the signal processing point of view, the unreliability problem is largely attributed to the "catastrophic" error propagation of the DFE when the tap coefficients of the equalizer do not match that of true channel resulting in symbol errors. Impulsive noise can further distort the tap coefficient estimation. The problem is compounded by the fact that the errors are propagated to later symbols, since the incorrect tap coefficients are slowly updated/corrected. This can result in a "catastrophic" condition, namely, incorrect decisions leading to more incorrect decisions. When the accumulated errors exceed a certain threshold (e.g. −8 dB), the processor diverges and cannot recover.

To mitigate the equalizer failure, one approach, described in "Blind adaptive multiple-input decision-feedback equalizer with a self-optimized configuration," J. Labat and C. Laot, *IEEE Trans. Comm.* Vol 49, No. 4, 646-654 (2001), is to use blind equalization to recover from the catastrophic condition. Another approach, described in "Channel-estimation-based adaptive equalization of underwater acoustic signals," M. Stojanovic, L. Freitag and M. Johnson, *IEEE OCEANS'99* Vol. 1, 590-595, Seattle Wash. (1999), is to develop improved tracking of the time varying channel impulse response and update the tap coefficients accordingly. A third approach described in "Iterative equalization and decoding techniques for shallow water acoustic channels," E. M. Sozer, J. G. Proakis, and F. Blackmon, *IEEE OCEANS* 2001 Vol. 4, 2201-2208 (2001) uses iterative equalization and decoding to correct for symbol errors.

These DFEs' algorithms commonly employ many parameters at the user's discretion. Experimental findings indicate their performance can be sensitive to, and may require some delicate adjustments and balancing of the parameters, which the user cannot foresee. This problem is notably worse when the source or the receiver is moving since another parameter is involved, i.e., the Doppler estimation. Post data analysis demonstrates that many errors are caused by incorrect Doppler estimation in at-sea (real-time) data processing.

For any signal processing method to be useful in practical, un-supervised, applications, it must be robust and reliable under various environmental conditions. In other words, it must adapt to different channel (propagation) conditions as found in various oceans. Robustness can be achieved through the use of some invariant features of the signal and/or well-founded (signal processing) principles. Two performance measures for robustness and reliability are: the BER for a given input signal-to-noise ratio and the percentage of the packets that achieve the given BER. Another issue that involves signal processing has to do with practical (system) constraints, namely, (computation) power limitation for a practical acoustic modem. To assure fast convergence, the DFE normally uses a recursive least square (RLS) algorithm. This algorithm is computationally intensive. The number of calculations is proportional to $(NM)^2$, where N is the number of receiver channels and M is the total number of feed forward and feedback coefficients per channel. Conventional channel equalizer requires feedback taps that cover the entire multipath spread; the number can easily exceed 100 per channel. A sparse DFE determines the positions of significant taps by estimating the channel impulse response whose magnitude exceeds a pre-determined threshold. A significantly smaller number of tap coefficients are used resulting in a substantial saving in numerical computations. However, one finds that in practice the number of taps (from the above estimate) needs to be enlarged by a certain percentage (e.g. 10%) to allow for fluctuations in the multipath arrival time (over the packet duration) due to temporal variations of the propagation medium, and signal dilation/compression by time varying Doppler shift. Poor performance can result if no provision is given for the "rotation and drift" of the tap coefficients. The sparse channel estimation was found as one of the major metrics in performance analysis of experimental data. The reasons can be traced to: (1) inaccurate estimation of weak arrivals due to insufficient input signal-to-noise ratio, and (2) temporal variation of multipath arrivals within a packet due to source changing range and depth. Note that the number of feed forward and feedback coefficients must be determined in situ.

Another approach described in "Reduced-complexity spatial and temporal processing of underwater acoustic communication signals," M. Stojanovic, J. Catipovic and J. G. Proakis, J. Acoust. Soc. Am. 98 (2), 961-972 (1995), obtains reduction in computational complexity by transforming the receiver data from the element space to the beam space, and applying multi-beam DFE. This reduced complexity multi-channel combining method is effective when a large number of receivers are used since the numbers of beams that contain the signal energy are usually small (arrival angle normally limited to <15° from the horizon). This approach is not useful when only a small number of receivers are available as often is the case in practice. Not only does the computational advantage disappear but also the beam widths are too wide to track the signal arrival angles. Also, beam diversity has not been shown to be as effective as element (spatial) diversity.

Another approach for underwater acoustic communication using the so-called passive-phase conjugation method is based on the concept of (passive) time-reversal. An active time reversal method uses the time-reversed channel impulse response function to modulate the transmitted signal. The method is illustrated in "An initial demonstration of underwater acoustic communication using time reversal," J. Edelmann et al, IEEE J. Oceanic Eng. 27, 602-609 (2002). The time-reversed impulse response after (back) propagation through the ocean waveguide is converted back to the original pulse plus some side lobes. Given a vertical array of sources, the back-propagated signal is focused at the location of the original probe source. Active time reversal requires two-way transmissions. Passive-phase conjugation carries out this "back-propagation" process in the computer using only one-way transmission as illustrated in "Underwater acoustic communication by passive-phase conjugation: Theory and experimental results," D. Rouseff et al, IEEE J. Oceanic Eng. 26, 821-831 (2001). A probe signal is sent first, from which the channel impulse response function is estimated. The received data is convolved with the phase conjugated or time-reversed channel impulse response and summed over all the receiver channels. The summed data should have minimal ISI if a vertical array of receivers is used. Time-reversal or passive-phase conjugation minimizes ISI but does not totally remove it. The advantage is that the receiver processor is simple. Time-reversal or passive-phase conjugation assumes that the underwater acoustic communication channel is time invariant. For a time varying ocean, the channel impulse response needs to be re-estimated by channel tracking.

SUMMARY OF THE INVENTION

According to the invention, an underwater communications system includes an antenna array, a sound transmission source for transmitting communication packets, and a receiver including a processor. The processor is programmed for receiving and detecting a Doppler-sensitive probe signal and training sequence, for estimating a channel impulse response function for correlating the received signal to yield a plurality of processed channel outputs, and for summing the channel outputs to yield a common receiver output. The common receiver output is applied to a Decision Feedback Equalizer (DFE) for adaptive correction of the inter-symbol interference and to retrieve the transmitted communication message.

Also according to the invention, a method of receiving sound transmissions includes detecting a probe signal from the sound transmissions, routing the probe signal to a correlation processor, processing the probe signal using a matched filter based on a set of pre-calculated Doppler-shifted probe signal waveforms within an anticipated range of Doppler shift, estimating a Doppler shift from the matched filter output in the form of a broadband ambiguity surface as a function of Doppler shift and multipath delay time, estimating the channel impulse response from the corresponding matched filter output at the estimated Doppler-shift, correlating the received signal following the probe signal with the Doppler-corrected channel impulse response function for each of a plurality of receiver channels to generate a plurality of channel outputs, summing the channel outputs, and processing the summed channel outputs with a DFE.

A DFE of the invention is provided whose tap coefficients are implicitly determined by the sum of auto-correlations of the channel impulse responses. The main advantages of the DFE of the invention are robustness and reliability (<1% uncoded BER for >90% of transmitted packets) under different propagation conditions, and applicability to all shallow waters without user supervision. It has a simple receiver structure, consisting, for example, of a total of 48 tap coefficients (32 feed forward and 16 feedback taps), and is thus computationally simple and fast.

The invention provides an alternative decision feedback equalizer for underwater acoustic communications that couples the physics of signal propagation with signal processing. The DFE according to the invention is based on the auto-correlation of the channel impulse response functions summed over the receivers The DFE has, by design, several advantages compared with the conventional approach: (1) it works under a wide variety of ocean channel conditions with a fixed receiver configuration (e.g., 32 fractional feed forward taps and 16 feedback taps), and thus can be implemented in an autonomous (un-supervised) mode, (2) it is computationally simple and fast since effectively a single channel DFE is used, and (3) it performance is robust and reliable.

Additional features and advantages of the present invention will be set forth in, or be apparent from, the detailed description of preferred embodiments which follows.

BRIEF DESCRIPTION OF THE DRAWINGS

FIGS. 5a-d are graphs showing that substantially the same Q function was obtained for the invention in two different oceans.

FIG. 8a shows the channel impulse response as a function of depth; FIG. 8b shows the corresponding auto-correlation function as a function of delay-time with its peak normalized to one.

FIGS. 8c and 8d show the channel impulse response at a depth of ~10 m and ~30 m respectively plotted on a linear scale.

FIG. 8e shows on a linear scale the auto-correlation function (of FIG. 8b) summed over all receivers.

FIG. 18 plots the results of the BER and percentage of update for a prior art DFE.

FIG. 25 plots the equivalent channel impulse response (the Q function) for 7 channels for a DFE according to the invention.

DETAILED DESCRIPTION OF THE PREFERRED EMBODIMENTS

Figure 1:
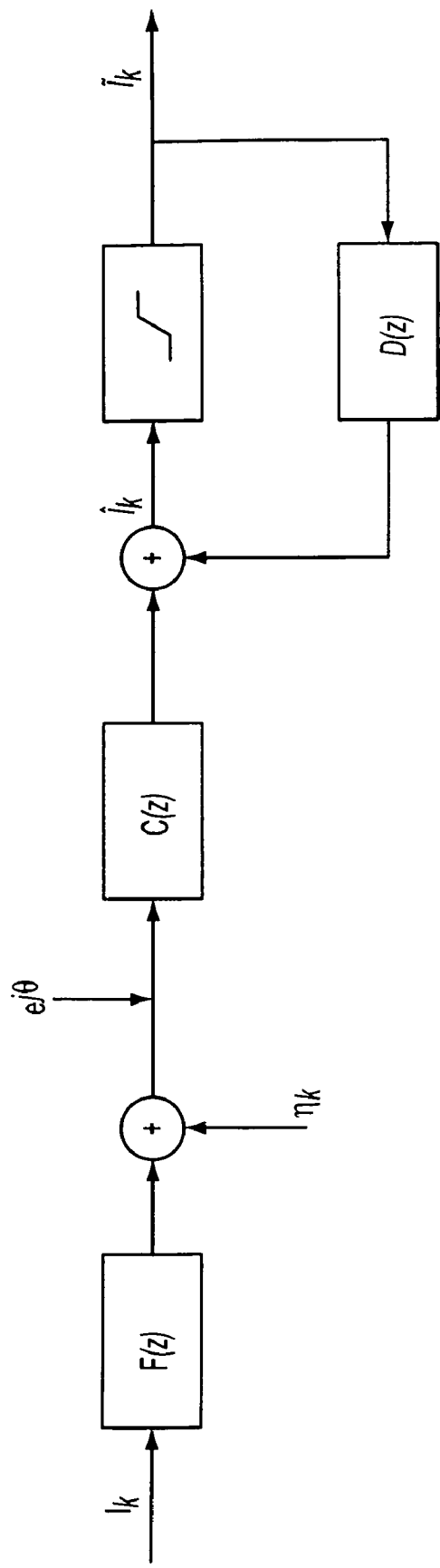
FIG. 1 is a block diagram of a single channel prior art DFE.
Figure 2:
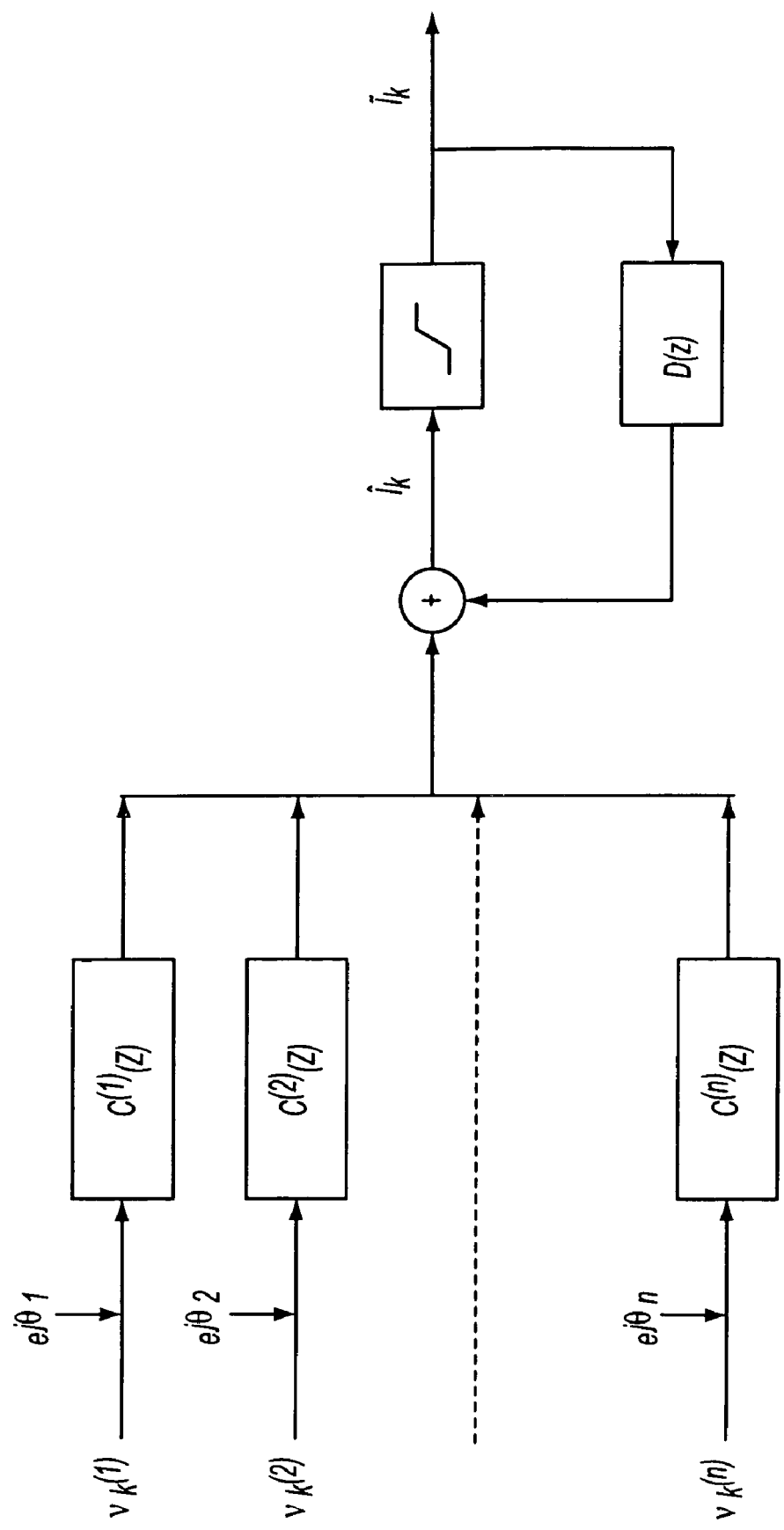
FIG. 2 is a block diagram of a multi-channel prior art DFE.
Figure 3:
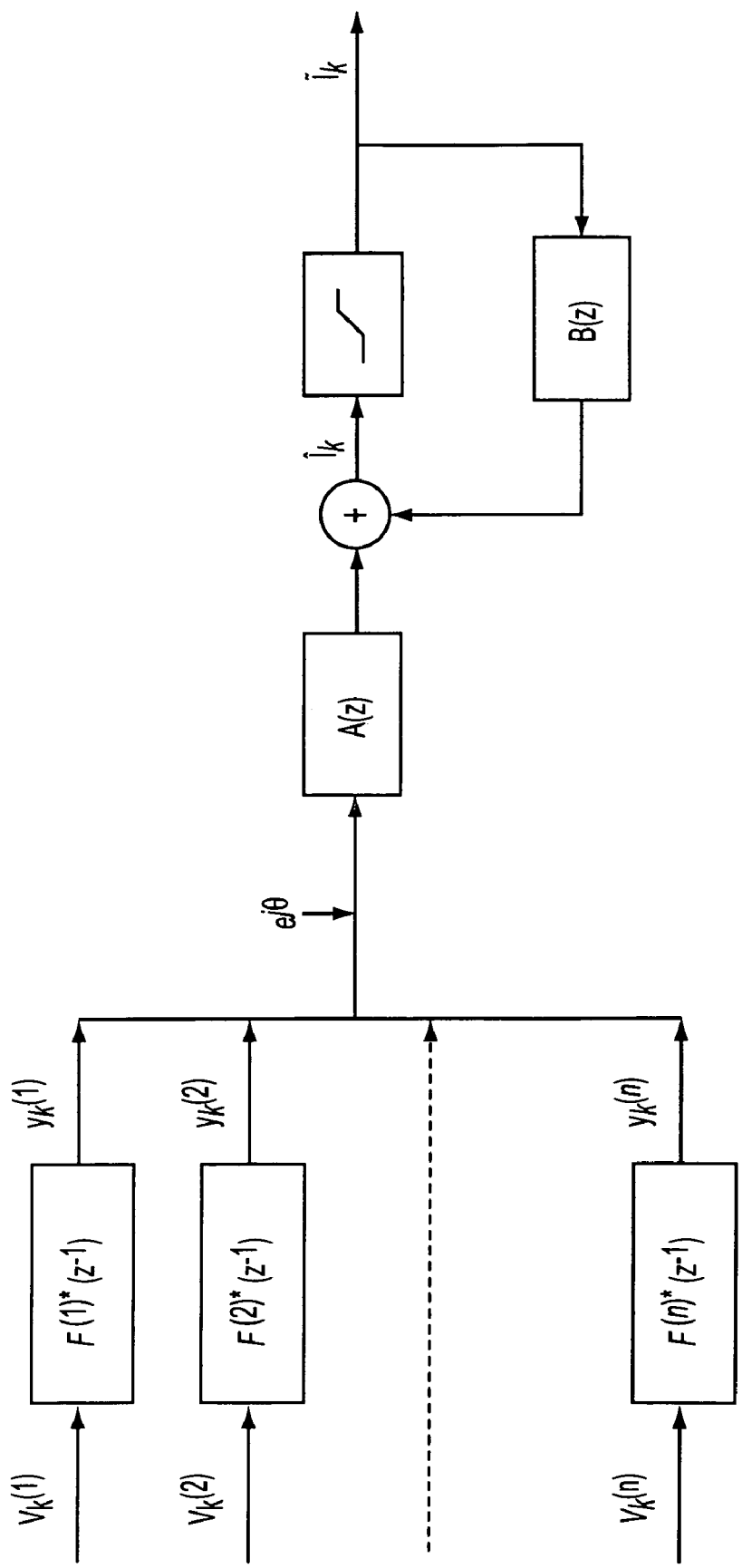
FIG. 3 is a block diagram of a DFE according to the invention.
Figure 4A:
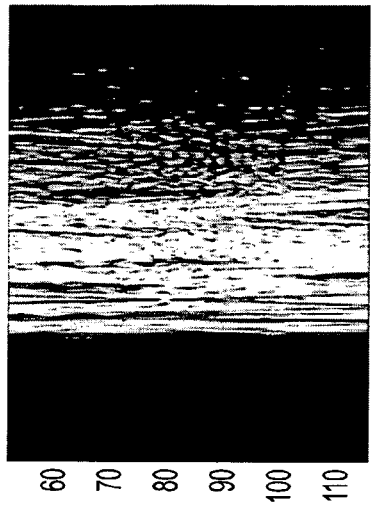
FIG. 4 shows the channel impulse response as a function of multipath delay time and receiver depth measured in four shallow water experiments with water depth varying from 80 to 120 m.
Figure 4B:
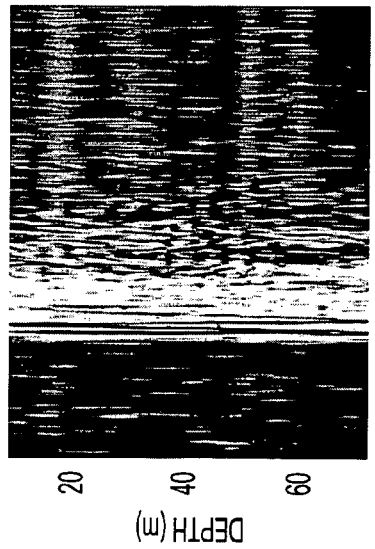
Figure 4C:
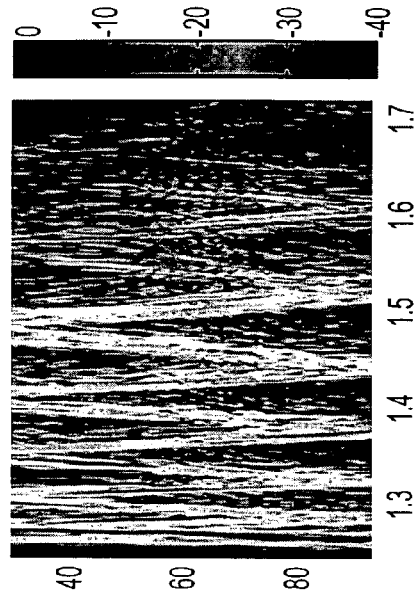
Figure 4D:
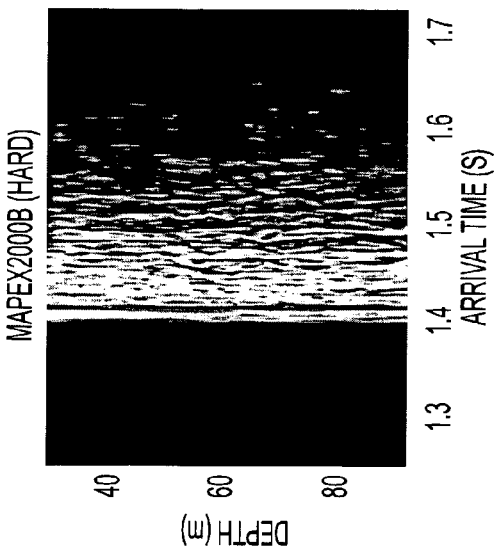

FIG. 1 illustrates a single channel prior art DFE. FIG. 2 illustrates a multi-channel prior art DFE. FIG. 3 illustrates a DFE according to the invention. The differences between them are illustrated by the equations and discussions presented below.

Conventional DFE (Impulse Response Based DFE)

The received signal can be expressed in the base band as $$r_j(t) \sum_n I_n h_j(t - nT) + z_j(t) \quad (1)$$

where $z_j(t)$ represents band-limited noise, and $h_j$ represents a band-limited channel impulse response for the $j^{th}$ receiver, obtained by the convolution of the transmitter filter and/or receiver filter with the channel impulse response function. Taking one sample per symbol, one has $$v_k = \sum_{n=0}^{L} f_n I_{k-n} + \eta_k \quad (2)$$

where $\{v_k\}$, $\{\eta_k\}$ are discrete received signal and noise sequences respectively with k being sample index. $\{f_n\}$ is a discrete representation of the band limited impulse response function of length L+1.

In the conventional equalizer, for a minimum phase channel, i.e. $f_{n-1} > f_n$, for n=1, ... L, one can solve Eq. (2) for the $k^{th}$ symbol $I_k$ in terms of the incoming data $v_k$, and previous resolved symbols:

$$I_k = f_0^{-1} v_k - \sum_{n=1}^{L} f_0^{-1} f_n I_{k-n} + f_0^{-1} \eta_k. \quad (3)$$

Eq. (3) has the form of a DFE $$\hat{I}_k = \sum_{j=-K_1}^{0} c_j v_{k-j} + \sum_{j=1}^{K_2} d_j \tilde{I}_{k-j} \quad (4)$$

with one feed forward tap coefficient $c_{-1} = (f_0)^{-1}$ and L feedback tap coefficients, $d_n = (f_0)^{-1} f_n$, n=1 ... L. The decision symbol $\tilde{I}_{k-j}$, in the ideal case without noise, is the same as the true symbol. $\hat{I}_k$ is the estimated symbol. Both the noise and incorrectly estimated tap coefficients contribute to the error between the estimated and true symbol.

If $f_1$ has the largest amplitude, one can use Eq. (5) for $I_{k-1}$ and obtain $$I_k = f_0^{-1} v_k - (f_1 / f_0^2) v_{k-1} - \quad (5)$$
$$\sum_{n=2}^{L} (f_1 f_{n-1} / f_0^2 - f_n / f_0) I_{k-n} + (f_1 f_L / f_0^2) I_{k-L-1}$$

Comparing Eq. (5) with Eq. (4), it is evident that Eq. (5) is equivalent to a DFE with two feed forward coefficients and L feedback coefficients. For the general case of arbitrary multipath arrivals, one can solve the coefficients $\{c_j\}$ and $\{d_j\}$ in terms of the channel impulse response as shown in "Differences between passive-phase conjugation and decision-feedback equalizer for underwater acoustic communications," T. C. Yang, IEEE J. Oceanic Eng. 29, 472-487 (2004).

Equation (4) is represented schematically in FIG. 1 and is extended to multiple receivers as shown in FIG. 2. In both FIG. 1 and FIG. 2, a phase correction is inserted which is obtained using a phase locked loop (PLL), where the PLL is useful for real data analysis. The feed-forward and feedback coefficients are first estimated using the training data. For the message data, for each estimated symbol, a decision is made as to which symbol best matches the estimated symbol. That is the new (kth) decision symbol. The error between the estimated and decision symbol is used to (recursively) update the tap coefficients. The process continues to the next symbol. One sees that error due to incorrect decision at the current symbol propagates to (and influences the decisions of) the later symbols via the incorrectly updated tap coefficients.

Correlation Based DFE

Convolving Eq. (5) with the complex conjugate of the channel impulse response function, one obtains after some manipulations in summation indices, $$y_k \equiv \sum_{l=0}^{L} h_l^* v_{k-l} = x_0 I_k + \sum_{n=1}^{L} x_n I_{k-n} + \sum_{n=1}^{K} x_n^* I_{k+n} + \sum_{l=0}^{L} h_l^* \eta_{k-l}, \quad (6)$$

where $$x_n = \sum_{l=1}^{L-n} h_l^* h_{l+n}$$

is the discrete representation of the auto-correlation of the channel impulse response function. (* denotes complex conjugation.)

Consider multiple receivers next. Summing Eq. (6) over J receivers, one has $$I_k = y_k - \sum_{n=1}^{L} x_n I_{k-n} - \sum_{n=1}^{L} x_n^* I_{k+n} + N_0 \quad (7)$$

where $$N_0 = \sum_{j=1}^{J} \sum_{l=0}^{L} h_{j,l}^* \eta_{j,k-l}$$

is the noise term, and $\{y_k\}$ and $\{x_k\}$ are redefined as $$y_k = \sum_{j=1}^{J} \sum_{l=0}^{L} h_{j,l}^* \quad (8)$$

and $$x_n = \sum_{j=1}^{J} \sum_{l=1}^{L-n} h_{j,l}^* h_{j,l+n}. \quad (9)$$

The $\{x_n\}$ in Eq. (7) are discrete representations of the auto-correlation functions of the impulse responses summed over the receivers, referred to as the Q function. This assumes a channel normalization with $x_0=1$ in Eq. (7).

Equation (8) represents the passive-phase conjugation process. Equation (7) shows that the output of passive-phase conjugation $(y_k)$ differs from the true symbols by some remaining ISI terms (the $2^{nd}$ and $3^{rd}$ terms in Eq. 7). It can be shown that the coefficients of these terms $\{x_n\}$ approach zeros as more receivers are included on the vertical line array.

Equation (7) is the basis for the new equalizer according to the invention, which can be implemented in terms of a feed forward and feedback equalizer $$\hat{I}_k = \sum_{n=0}^{L} a_n y_{k+n} + \sum_{n=1}^{L} b_n I_{k-n}^{\%}, \quad (10)$$

where $\{a_n\}$ and $\{b_n\}$ are the feed forward and feedback coefficients in FIG. 3. In the absence of noise, the equalizer coefficients $\{a_n\}$ and $\{b_n\}$ are "completely" determined by $\{x_n\}$.

The feed forward and feedback tap coefficients $\{a_n\}$ and $\{b_n\}$ in Eq. (10) are in theory determined by the auto-correlation of the impulse responses summed over all channels, i.e., the $\{x_n\}$ as given in Eq. (7). Rewriting Eq. (7) as $$y_k = I_k + \sum_{n=1}^{L} x_n I_{k-n} + \sum_{n=1}^{L} x_n^* I_{k+n}$$

and substituting into Eq. (10) yields $$I_k = \sum_{n=0}^{L} a_n \left[ I_{k+n} + \sum_{m=1}^{L} x_m I_{k+n+m} \right] + \sum_{n=1}^{L} b_n I_{k-n} \quad (11)$$

Note that Eq. (11) is true for all $I_{k+p}$, p=−L, 0, L. Hence, its coefficients must be zero. For the coefficients of $I_k$ (i.e., p=0), one finds, noting that $x_0=1$, $$1 = \sum_{n=0}^{L} a_n x_n. \quad (12)$$

For the coefficients of $I_{k+p}$ (i.e., p>0), one finds $$0 = \sum_{n=0}^{L} a_n x_{n-p} \quad (13)$$

for $$0 < p \leq L.$$

For the coefficients of $I_{k-p}$ (i.e., p>0), one finds $$-b_p = \sum_{n=0}^{L-p} a_n x_{n+p} \quad (14)$$

-continued $$\text{for}$$
$$0 < p \leq L.$$

Equations (12) and (13) can be combined into the following form $$\begin{pmatrix} x_0 & x_1 & L & x_{L-1} & x_L \\ x_{-1} & x_0 & L & x_{L-2} & x_{L-1} \\ M & M & O & M & M \\ x_{-L+1} & x_{-L+2} & L & x_0 & x_1 \\ x_{-L} & x_{-L+1} & L & x_{-1} & x_0 \end{pmatrix} \begin{pmatrix} a_0 \\ a_1 \\ M \\ a_{L-1} \\ a_L \end{pmatrix} = \begin{pmatrix} 1 \\ 0 \\ M \\ 0 \\ 0 \end{pmatrix} \quad (15)$$

The (L+1)×(L+1) matrix on the left hand side of (15) is positive definite and its determinant is in general non-zero. One can therefore solve for the coefficients $\{a_n\}$ in terms of $\{x_n\}$. Equation (15) can then be used to determine the coefficients $\{b_n\}$. The above set of equations (12)-(15) can also be derived in another way using the z transform in digital signal processing.

Dependence on the Propagation Environment

The two equalizers (conventional DFE and the DFE of the invention) exhibit different sensitivities under different channel conditions. It is well known that the channel impulse response functions vary significantly from ocean to ocean. As a result, the performance of the conventional DFE is sensitive to the channel estimation and the number of tap-coefficients used. Despite these variations, the auto-correlation of the channel impulse responses summed over the receivers (the Q function) is shown to have a universal property, which leads to a universal implementation of the DFE of the invention for a majority of the shallow waters.

Properties of the Q Function: Theory

The continuous (analog) expression of the Q function can be used to illustrate the physics of the correlation-based equalizer. Again, for a time invariant channel, $$y(t) = \sum_j h_j^*(-t) \otimes r_j(t) \quad (16)$$

$$= \sum_j h_j^*(-t) \otimes (h_j(t) \otimes s(t) + z_j(t))$$

$$\equiv Q(t) \otimes s(t) + \varsigma(t),$$

where $$\varsigma(t) = \sum_j h_j(-t) \otimes z_j(t)$$

is the filtered noise, Q is the auto-correlation of the impulse response functions summed over the channels. Equation (7) follows naturally from Eq. (16), noting that $x_{-n} = x_n^*$ (or $Q(-t) = Q^*(t)$). (The impulse response is complex in the base band.)

The Fourier components of the Q function (in the pass band) is given by $$Q(\omega) = \sum_j H_j^*(\omega) H_j(\omega) \quad (17)$$

$$= \frac{2\pi}{r_j} \sum_{m,n} \exp(j(k_n^* - k_m)r) \psi_n(z_S) \psi_m(z_S)$$

$$\sum_j \psi_n(z_j) \psi_m(z_j) / \sqrt{k_n k_m}$$

where $H_j(\omega)$ is the Fourier transform of the impulse response and is expressed in terms of the normal modes as $$H_j(\omega) = \sum_m \sqrt{2\pi} \exp(-jk_m r) \psi_m(z_j) \psi_m(z_S) / \sqrt{k_m r_j} \quad (18)$$

where m is the mode number, $k_m$ is the mode wavenumber, and $\psi$ is the mode depth function evaluated at frequency $\omega$ and receiver depth $z_j$, and r is the range to the vertical array. For many receiver elements, assuming mode orthogonality $$\sum_j \psi_n(z_j) \psi_m(z_j) = \delta_{m,n}, \quad (19)$$

one finds $Q(\omega) = Q_0(z_s)$, where $Q_0$ is defined as $$Q_0(z) = \frac{2\pi}{r} \sum_m \psi_m(z_S) \psi_m(z) \exp(-2\alpha_m r) / k_m, \quad (20)$$

to show the depth dependence, with $\alpha_m$ denoting the mode attenuation coefficients.

At this point, one recalls the relationship of the Q function to time reversal focusing. For a lossless waveguide, Equation 20 yields spatial focusing by employing mode completeness, $$\sum_m \psi_m(z) \psi_m(z_S) = \rho^{-1} \delta(z - z_s).$$

In reality, given a finite number of modes (as in a lossy waveguide), depth focusing is represented by $$\sum_m \psi_m(z) \psi_m(z_S) \approx \rho^{-1} sinc((z - z_s) / \Delta_z),$$

where $\Delta_z$ is the depth resolution of spatial focusing. For the value at the focused point, $z=z_s$, one finds, $Q(\omega)=Q_0(z_s)$; $2\pi/\rho r \exp(-2\bar{\alpha}r)/\bar{k}$, where "−" above a variable denotes approximation by its mean value.

The time domain property of the Q function is obtained by taking an inverse Fourier transform, $$Q(t) = \int_{f_c-B/2}^{f_c+B/2} Q(\omega)\exp(j\omega t)d\omega \qquad (21a)$$

$$= 2Q_0(z_s)\exp(j2\pi f_c t)\frac{\sin(\pi B t)}{t},$$

After removing the carrier frequency, the Q function has a universal sinc function dependence in time. This result is independent of the acoustic environments of the sound channel (sound speed and bottom profile), and source-receiver depths.

When only a small number of receivers are available as for underwater acoustic communications, $Q(\omega)$ is given by Eq. (17). Even in this case, assuming that $Q(\omega)$ is a smooth function of frequency, one has $$Q(t) = \int_{f_c-B/2}^{f_c+B/2} Q(\omega)\exp(j\omega t)d\omega \qquad (21b)$$

$$= 2\overline{Q}\exp(j2\pi f_c t)\frac{\sin(\pi B t)}{t},$$

by the interpolation equation, where $\overline{Q}=Q(\omega_0)$ with $\omega_0$ close to the carrier frequency. Q(t) still behaves like a sinc function with a width equal to the bandwidth B. It has small side lobes. This is a characteristic feature of a waveguide. The value of $\overline{Q}_0$ will be different for different oceans.

A receiver configuration should accordingly be selected such that the $Q(\omega)$ is a piecewise smooth function of frequency. In that case, the Q function will have a finite time span as suggested by Eq. (21b).

The Q function provides spatial diversity in two ways. It yields lower side lobe levels as reflected by the sinc function. This is the reason that passive-phase conjugation reduces the ISI. It reduces the symbol phase variance, allowing higher data rate to be communicated. Both properties are incorporated into the correlation-based equalizer.

Properties of the Q Function: Experimental Data

Experimental data collected at-sea are used to demonstrate sensitivity of the impulse response functions to the channel conditions and the properties of the Q function.

Dependence on the Channel Environments

FIG. 4 shows the channel impulse response as a function of multipath delay time and receiver depth measured in four shallow water experiments with water depth varying from 80 to 120 m, as described in "Geoacoustic inversion of data collected in two "typical" shallow-water environments," P. Nielson and M. Siderius, *J. Acoust. Soc. Am.* 113 (4), 2190 (2003). The data were collected using a long vertical array in four experiments: Advent 99, MAPEX 2000A and 2000B, and ASCOT 01. The Advent 99 experiment was done over the Adventure Bank in the Strait of Sicily in May of 1999, as described in "Experimental study of geoacoustic inversion uncertainty due to ocean sound-speed fluctuations," M. Siderius, P. Nielson, J. Sellschopp, M. Snellen and D. Simons. *J. Acoust. Soc. Am.* 110 (2), 767-781 (2001). The MAPEX 2000A and 2000B experiments were carried out in Sept. of 2000 in the Malta Plateau in areas with soft and hard bottoms, as described in "Range-dependent seabed characterization by inversion of acoustic data from a towed receiver array," M. Siderius and P. Nielson, *J. Acoust. Soc. Am.* 112 (4), 1523-1535 (2003). The ASCOT 01 experiment took place in June of 2001 in the Massachusetts Bay east of Boston, as described in "Combination of acoustics with high-resolution oceanography," J. Sellschopp, P. Nielsen and M. Siderius, in Impact of littoral environmental variability on acoustic prediction, NATO SACLANTCEN Conference Proceedings. Italy (Sept. 2002). The source-receiver range was 10 km for Advent 99 and ASCOT 01 and variable for MAPEX experiments. The channel impulse responses were all estimated from broadband signals below 1 kHz. It is evident that the time separation and overall spread of the multipath arrivals differ significantly from location to location. The multipath structure also varies with the receiver depth. An autonomous underwater acoustic modem must be able to adapt to the different channel conditions due to either different sound speed, different bottom or source-receiver range changes.

The conventional DFE determines the number of taps to use from the channel impulse response function. This is done in practice by estimating the symbol span of the impulse response function above a certain threshold. For multiple receivers, the numbers of taps coefficients are determined for individual receivers and the maximum of them is used for the DFE. The tap numbers are further increased by a certain percentage (e.g.,. 10%) to accommodate for the tap "wander and drift" due to the time variation of the channel and signal dilation/compression resulting from changing Doppler (Doppler variation) within the data packet. In principle, this process can be automated. In practice, one finds that the performance of the sparse DFE is sensitive to the number of taps used and the BER can often be reduced in post analysis by modifying the number of taps used. This process is by trial and error. No uniform rule has been found that can be implemented autonomously.

The environmental dependence for the correlation-based DFE is illustrated in the ADVENT99 and ASCOT01 data using the ACOMMS data collected there. Henceforth, all data are centered at 3550 Hz with a bandwidth of 500 Hz. From Eq. (7), the symbol error correction for the DFE of the invention is based on the auto-correlation of the channel impulse responses summed over the receivers (the Q function, see above). In the upper panel of FIG. 5 the channel impulse response is plotted as a function of the receiver depth and delay time. The data were broadband linear frequency modulated (LFM) signals received on 16 channels. In the lower panel of FIG. 5 the Q function is plotted by summing the auto-correlations over all 16 receivers. Delay time is received time (relative to an arbitrary starting point) plus the lag time.

The channel auto-correlation functions possess two features that are desirable from the point of view of channel equalization. One is simultaneous symbol synchronization on all channels. Multipaths usually arrive at different receivers at different times, particularly when they are widely separated in depth. Hence, symbols need to be synchronized for individual channels separately and aligned between multi-channels in the conventional approach. Note on the other hand, that the peaks of the auto-correlation functions of the channel impulse responses are automatically aligned between the different channels (i.e., at zero lag time) irrespective of the different arrival time on different channels. Consequently, the symbol data after matched filtering the received data with the estimated channel impulse responses are automatically aligned. Another advantage is that the inter-symbol interference (ISI) caused by the sidelobes of the Q function is much less than the ISI caused by the impulse response function. Note that the impulse response function is often dominated by several multipath arrivals having approximately equal order of magnitudes. The auto-correlation function, on the other hand, has always one main lobe plus many sidelobes. The sidelobes are usually much weaker than the main lobe as seen in FIG. 5. This means that the inter-symbol interference (ISI) in the matched-filtered data $\{y_k\}$ is often weaker than ISI in the original data $\{v_k\}$.

The auto-correlation function typically exhibits about double the time span than does the impulse response function. This means that the DFE for the matched-filtered data requires double the number of tap coefficients compared with the DFE for the original data. For processing multi-channels individually, the computational requirement can therefore exceed the capability of a real time modem with a given computing power. For this reason, matched filtering the data with the impulse response function has not been widely implemented in practice. This problem is overcome in the invention by means of the Q function. Given multiple receivers, the sidelobes of the Q function are fast decreasing away from the main lobe. The DFE of the invention thus requires only a small number of tap coefficients for a given peak-to-sidelobe-ratio (PTSR) of, say, 7 dB.

The Q function for a large aperture vertical line array of receivers behaves approximately like a sinc function with an argument $\pi Bt$ where B is the signal bandwidth. (The coefficient of the sinc function reveals the familiar spatial focusing property associated with time-reversal or passive-phase conjugation as mentioned above, which is not the subject here.) It is important to note that the sinc function behavior of the Q function is universally true independent of the sound speed profile in the acoustic waveguide. The real data will not exhibit the exact sinc function behavior due to the presence of noise and the fact that the receivers cover a portion of the water column. However, the Q function is expected to exhibit small sidelobe levels as the number of receivers increases. This property is demonstrated with real data in FIG. 5, lower panel.

With a smaller number of receivers, the penalty is a higher sidelobe level relative to the main lobe level. One finds in practice that a small number of receivers (with proper spatial separations) can yield a Q function with a minimal (~0.2 or less) sidelobe-to-peak ratio (STPR). The difference between different oceans is that a different number of receivers may be required to achieve the same STPR. Assuming this STPR is satisfied, a fixed number of tap coefficients (typically 48) can then be used for all ocean waveguides.

FIG. 5 is graphs showing that substantially the same Q function was obtained for the invention in two different oceans. FIGS. 6a-b, 7a-b, and 8a-b show that the Q function retains approximately the same STPR despite the temporal variation in the channel, and in the source and receivers geometry. Note that the locations of the sidelobes will change with time.

Figure 6B:
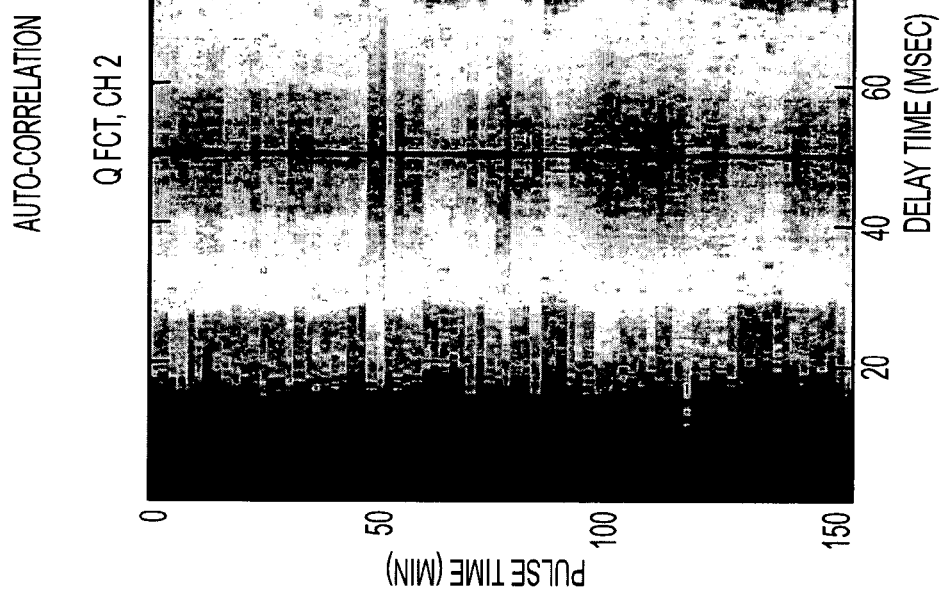
FIG. 6b shows the corresponding auto-correlation as a function of time with its peak normalized to one
Figure 6A:
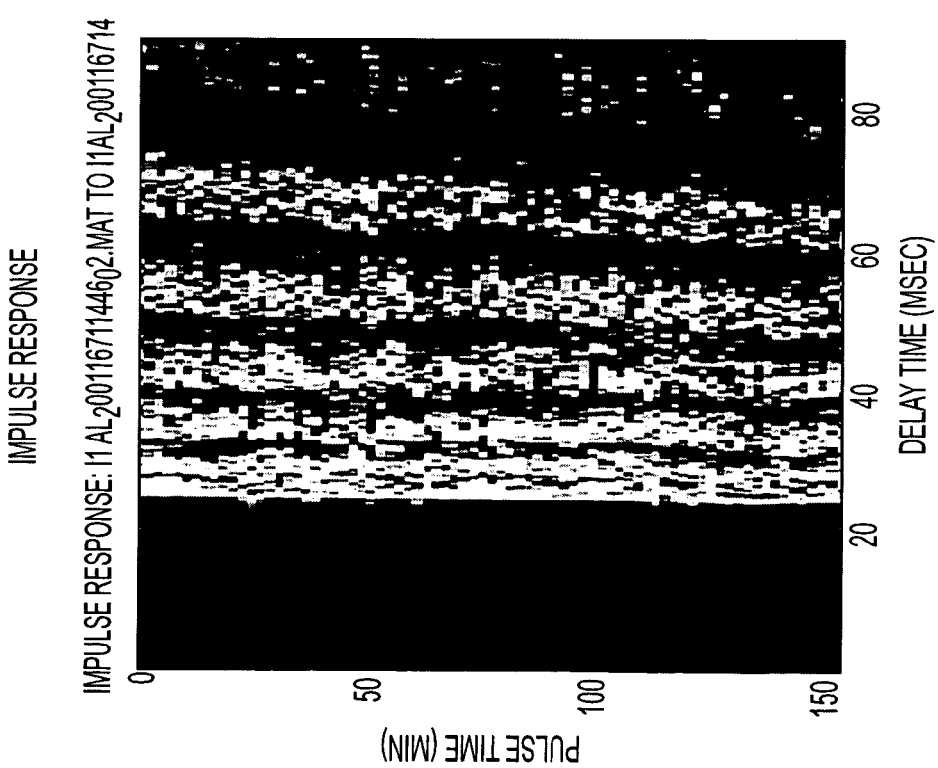
FIG. 6a shows the channel impulse response as a function of time using the LFM data collected during the ASCOT01 tests.

FIG. 6a shows title channel impulse response as a function of time using the LFM data collected during ASCOT01. It shows significant variations of the multipath arrival structure over a time scale of minutes to hours. The temporal variations are apparently caused by the ocean internal waves. FIG. 6b shows the corresponding auto-correlation as a function of time with its peak normalized to one. While the sidelobe structure changes, the auto-correlation has approximately the same time span (<20 ms) in terms of a given threshold level (PTSR of 7 dB). FIG. 6b is for a receiver at a depth of 81.6 m. When summing over multiple channels, the sidelobe structure will be smoothed and its level significantly reduced as shown in FIG. 5. For the conventional DFE, one must use different sets of tap coefficients (for different packets) to respond to the temporal variations of the channel. For the DFE of the invention, a fixed number of tap coefficients may be used despite the time varying channel conditions. This advantage is useful for autonomous un-supervised implementation of the DFE.

Dependence on the Source-Receiver Geometry

Figures 7A, 7B:
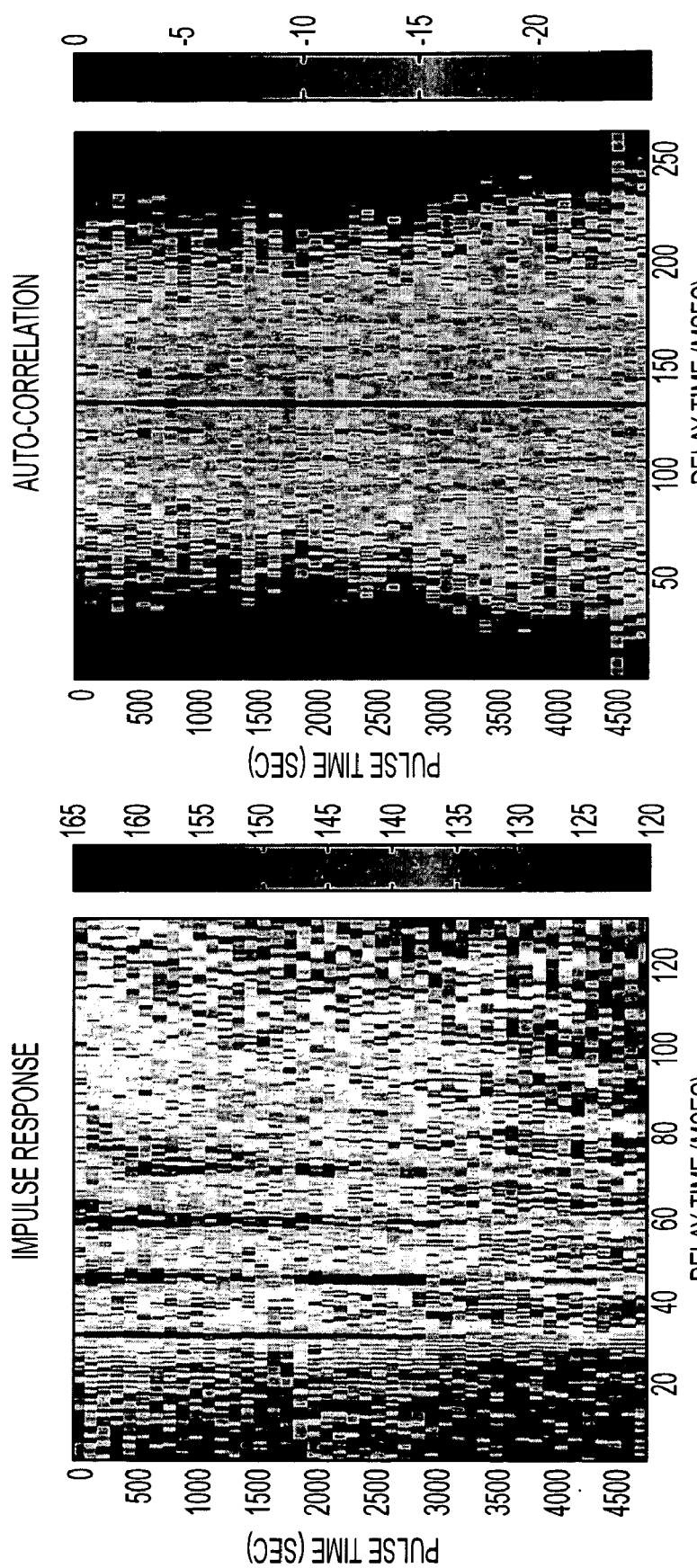
FIG. 7a shows the channel impulse response as a function of time for a moving source.
FIG. 7b shows the corresponding auto-correlation function as a function of time with its peak normalized to one.

FIG. 7a shows the channel impulse response as a function of time for a moving source with range increasing with time at the rate of 2 m/s (4 knots). The impulse responses were aligned by the first arrival. The data were collected during the RDS3 experiment in the Adriatic Sea in October of 2000. One sees a longer multipath spread at shorter ranges than at longer ranges, which can be explained by the increasing grazing angles of the multipath arrivals at shorter ranges. For the conventional DFE, more tap coefficients will be needed at shorter ranges. FIG. 7b shows the corresponding auto-correlation function as a function of time with its peak normalized to one. Despite the range changes, the auto-correlation has approximately the same time span (~80 ms) in terms of a given PTSR (−7 dB). FIG. 7b is for a receiver at a fixed depth (~10 m). When summing over multiple receivers, the sidelobe structure of the Q function will be smoothed and its (sidelobe) level significantly reduced.

FIG. 8a shows the channel impulse response as a function of depth using the RDS3 data at a range of ~2 km. The lower panel of FIG. 8a shows the impulse response functions at two depths. The impulse response function at a depth of ~10 m shows that the multipath arrival level decreases with delay time. This corresponds to the so-called "minimum phase" channel. The impulse response function at a depth of ~30 m shows, in contrast, that the multipath arrival level increases with delay time. This corresponds to the so-called "maximum phase" channel. The conventional multi-channel DFE is known to have difficulty handling the maximum phase channels or a mixture of minimum and maximum phase channels. FIG. 8b shows the corresponding auto-correlation function as a function of time with its peak normalized to one. The auto-correlation has approximately the same time span (~80 ms) in terms of a given PTSR (−7 dB). It does not matter whether the individual channel is minimum or maximum phase. When summing over multiple channels, the sidelobe structure of the Q function will be smoothed and its (sidelobe) level significantly reduced. Accordingly, the same receiver (processor) structure can be used for different ocean waveguides and for different source-receiver ranges and depths.

Data Analysis: Fixed Source and Fixed Receivers

Figure 11:
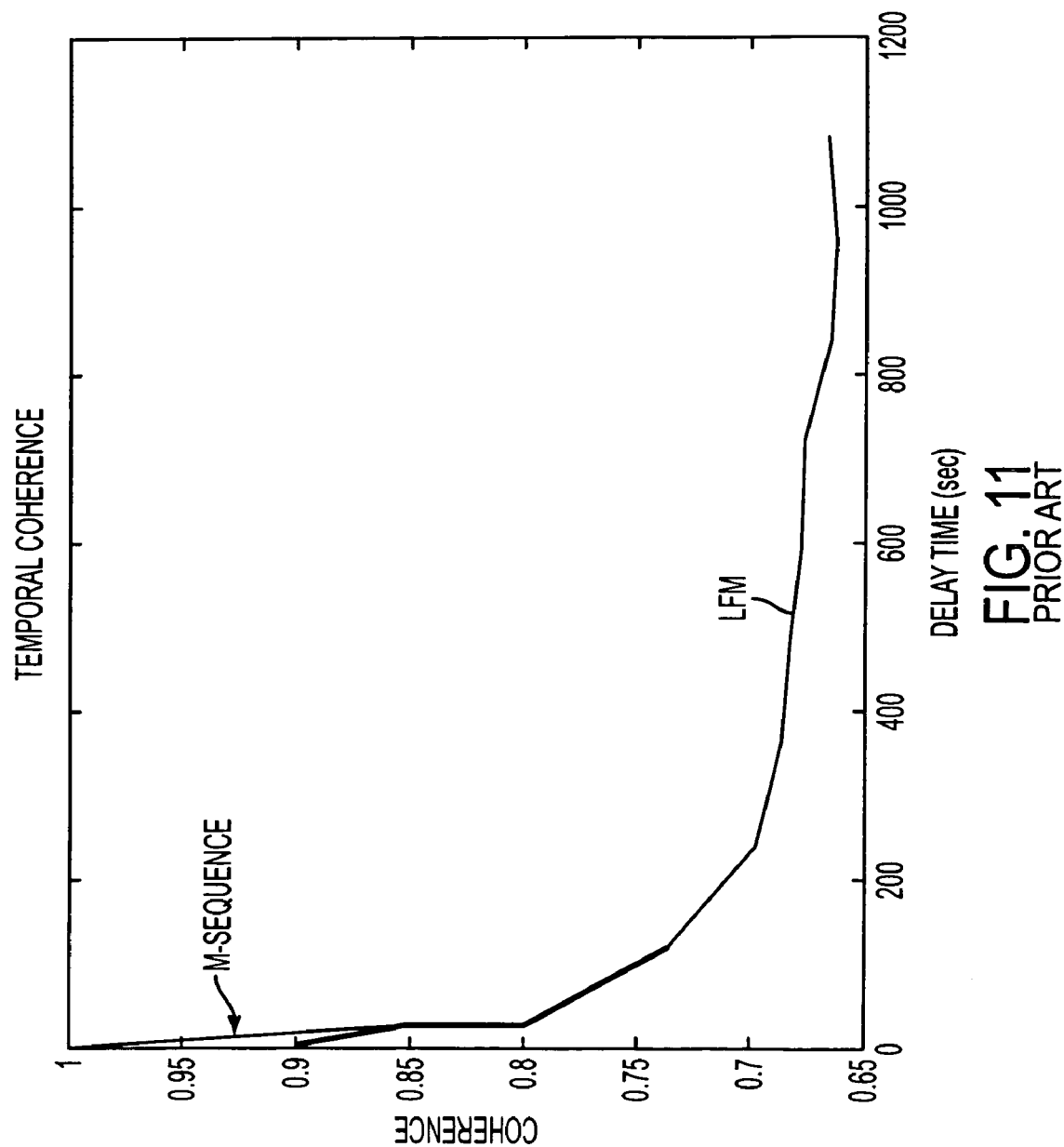
FIG. 11 plots the average of the intra-packet coherences and the temporal coherence at longer delay time for the prior art DFE as in FIG. 10.
Figure 12A:
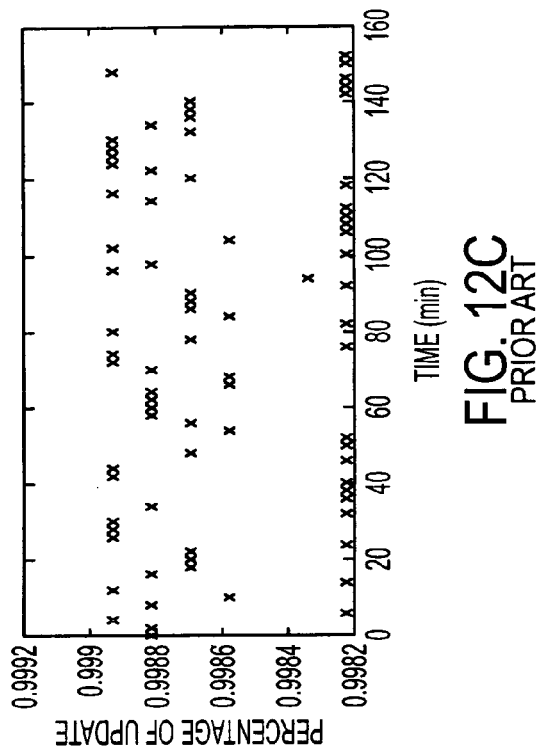
FIG. 12 plots the BER, MSE, output SNR, and the percentage of update for all 78 packets for the prior art DFE as in FIG. 10.
Figure 12C:
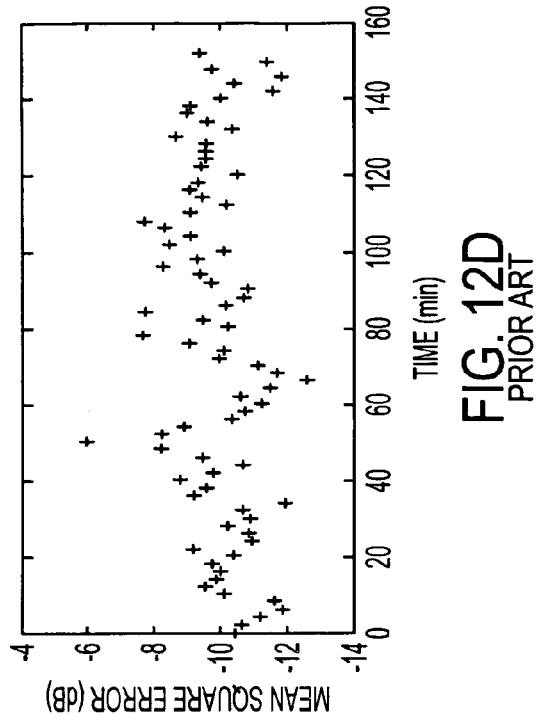
Figure 12B:
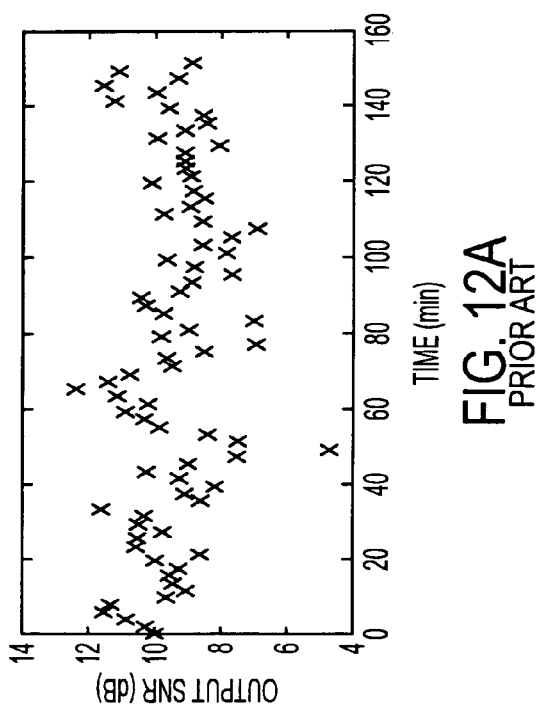
Figure 12D:
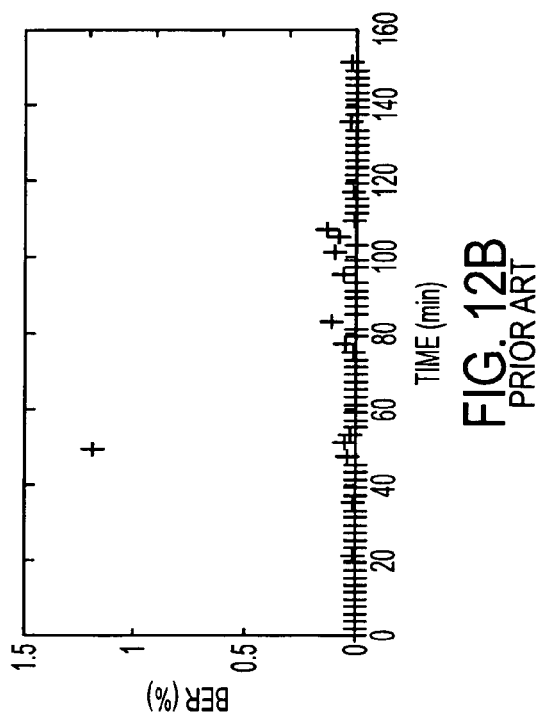

In this section, the ASCOT01 data is analyzed and the performance of the DFE of the invention compared with the conventional DFE. The source was at a depth of 96 m and the receiver array covered a depth of 30-90 m. Water depth was ~100 m. Seventy-eight packets of binary phase shift-keying (BPSK) signals, each of 10 sec long, were transmitted during a period of 150 minutes. Each packet contained a probe signal followed by a gap, and followed by data, beginning with the training data followed by the message data. The signal has a bandwidth of 500 Hz, centered at 3550 Hz. The measured channel impulse responses during this time period were shown in FIG. 6a, which exhibited significant temporal variations in the multipath arrival structure between packets. However, within each packet, the intra-packet signal correlation is high as evidenced by the high signal coherence (>0.8) as shown by the mean temporal coherence measured from sequence data as shown in FIG. 11. This indicates that the acoustic channel was relatively stable within the 10 sec, the packet length. The symbol phase encountered non-negligible phase change (presumably due to array motion), which, for a fixed source and fixed receiver, can be easily measured and removed.

Figure 9A:
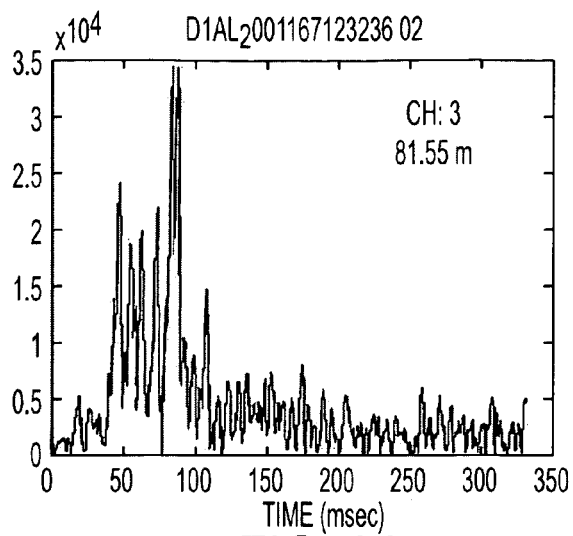
FIG. 9 shows an example of the channel impulse responses for receivers at a depth of 70.55, 75.55 and 81.55 m
Figure 9B:
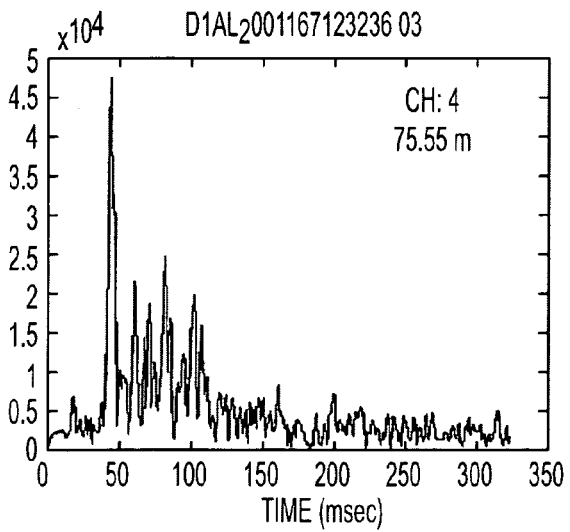
Figure 9C:
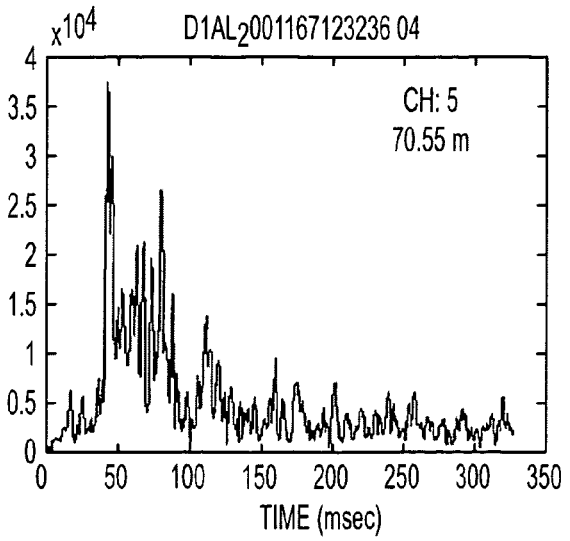
Figure 10A:
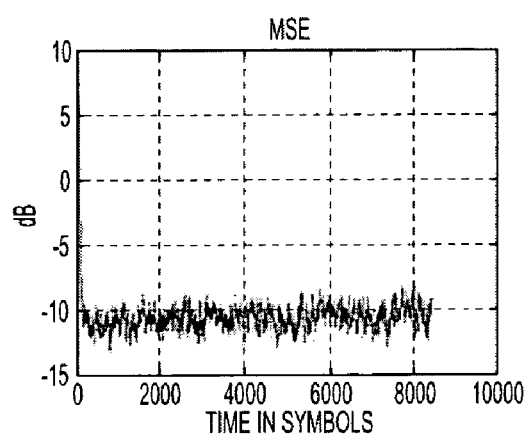
FIG. 10 shows the outputs of a prior art DFE for 3 channels for the first packet.
Figure 10B:
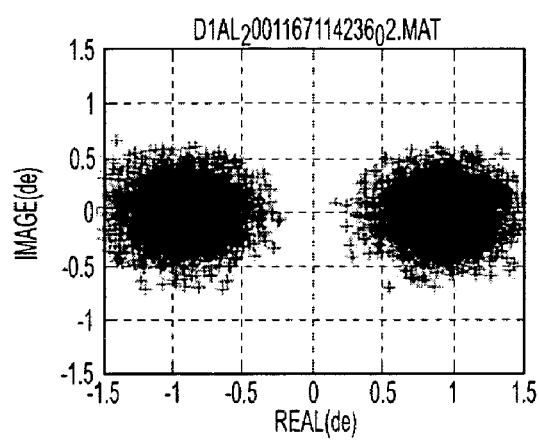
Figure 10C:
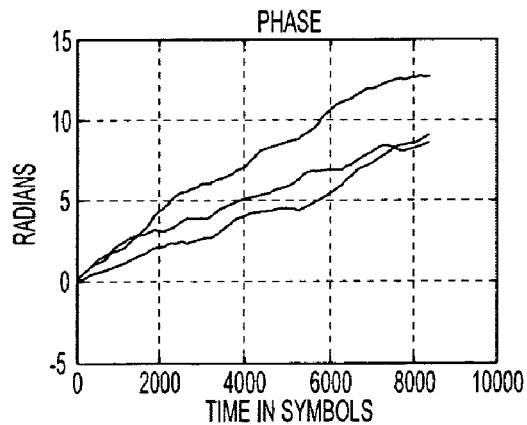
Figure 10D:
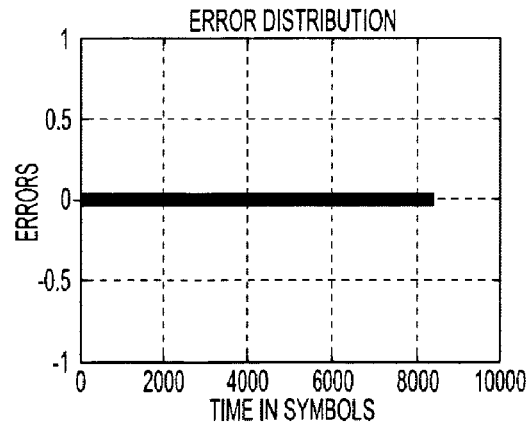

The entire 78 packets were then processed using three receiver channels. FIG. 9 shows an example of the channel impulse responses for receivers at a depth of 70.55, 75.55 and 81.55 m. The multipaths last about 80 msec (40 symbols). FIG. 10 shows the outputs of the conventional DFE for 3 channels for the first packet. There is no error for this packet. The MSE is about −10 dB.

A sparse DFE was used jointly with a PLL to process the data. For each packet, the impulse responses were estimated from the probe signals for all three channels (see FIG. 9). Putting a cursor at the peak of the impulse responses, the pre-cursor span of the impulse response determines the number of feed forward coefficients; two taps were used for each symbol. The post-cursor span of the impulse response determines the number of feedback coefficients at a threshold level of −15 dB—one tap for each symbol. For the PLL a proportional and integral constant of 0.005 and 0.0005 were respectively employed.

The results of the conventional DFE are shown in FIG. 12, which plots the BER, MSE, output SNR, and the percentage of update for all 78 packets. The BER is <0.2% except for one packet which has 1.3% BER. The MSE is on the average about −10 dB and the output SNR is about 10 dB. The input SNR is about 15-20 dB as seen in FIG. 9. Despite the rapid variation in the channel impulse response at the scale of minutes (FIG. 6), all packets are equalized with a small error. For each packet, the channel impulse responses are re-estimated. The channel impulse responses remain stable at the scale of seconds.

FIG. 12 also plots the percentage of update, which means the percentage of symbols that were updated by the RLS algorithm. Greater than 99.8% of the symbols were updated within each packet. The high update rate was caused by the fact that both the DFE and PLL were actively competing to remove the symbol phase change (due, presumably, to array motion). The high update rate should not be interpreted to imply that the channel impulse response is fast changing (within each packet). The impulse response is in fact very stable within each packet as evidenced by the high intra-packet temporal coherence. Indeed, the DFE update rate is small after the symbol phase drift is first removed from the data.

Figure 13A:
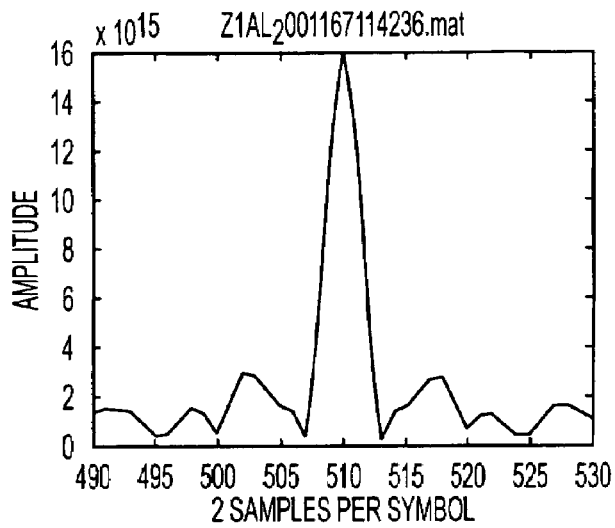
FIG. 13 shows three examples of the Q functions sampled over the beginning, middle and end of the data of a DFE according to the invention.
Figure 13B:
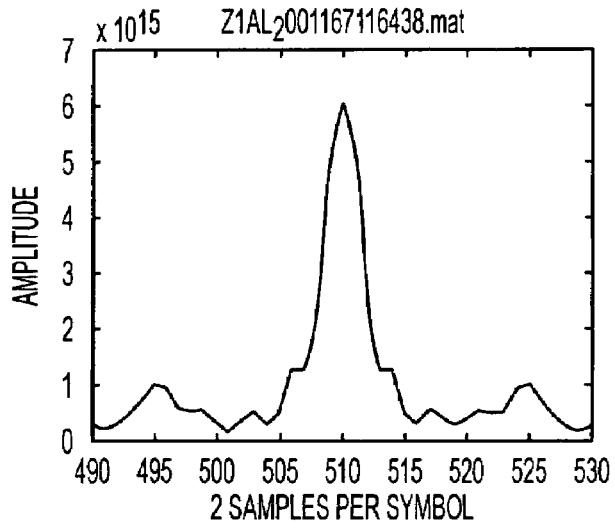
Figure 13C:
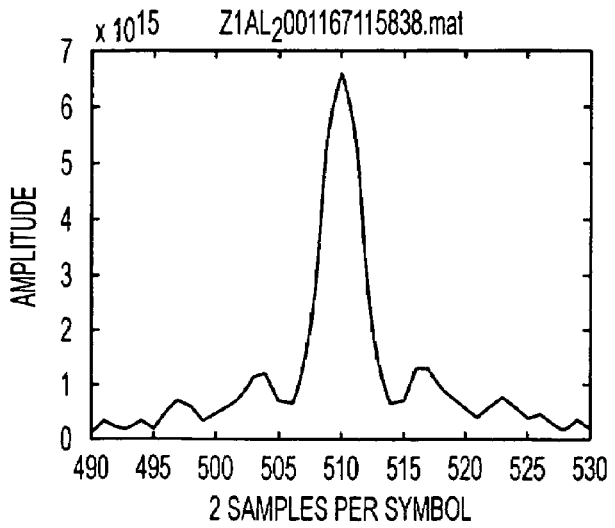
Figure 14A:
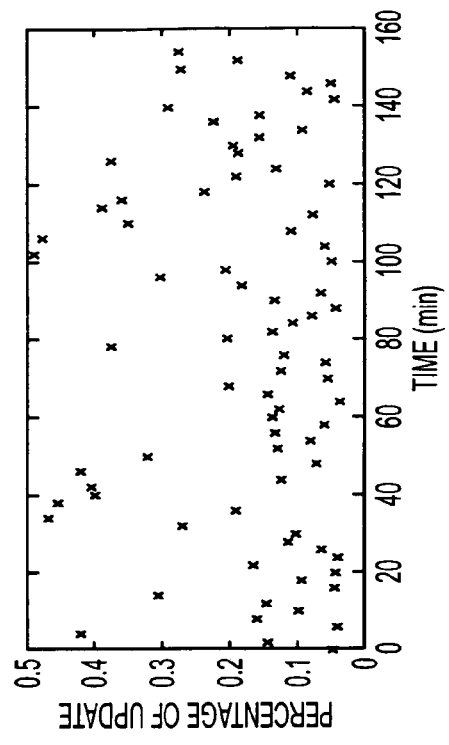
FIG. 14 shows the processing results for the BER, MSE, output SNR and percentage of update of a DFE according to the invention.
Figure 14B:
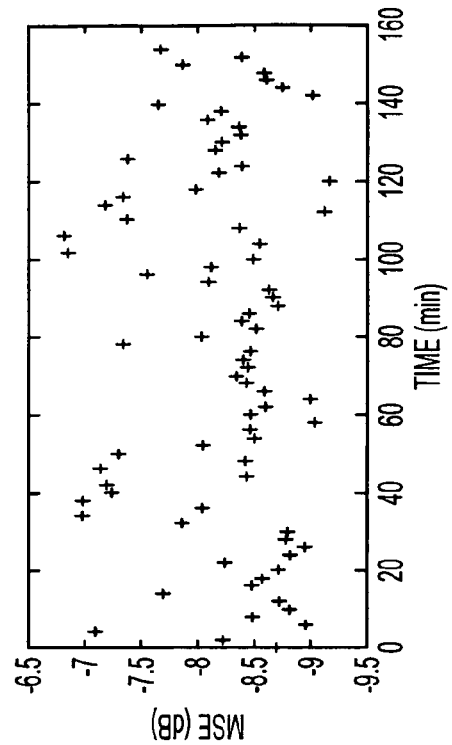
Figure 14C:
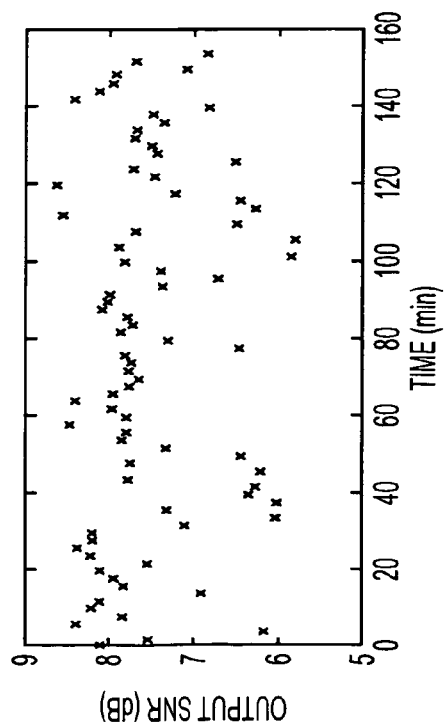
Figure 14D:
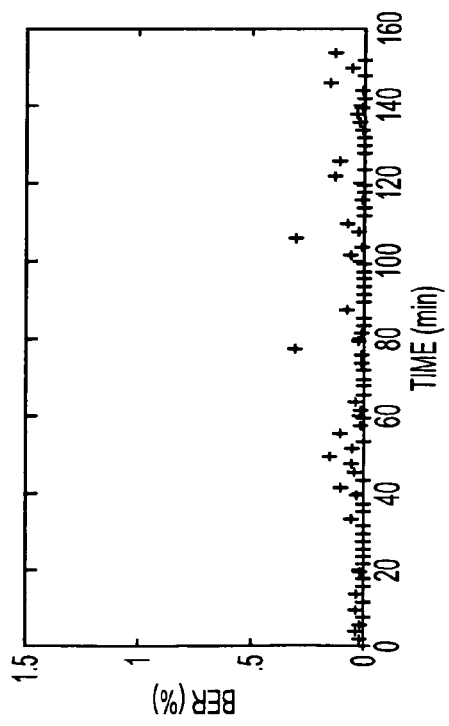

The same data were processed using the DFE of the invention jointly with a PLL, with the same parameters as mentioned above. The base band data (sampled at two samples per symbol) were matched filtered with the channel impulse response for each channel and summed over the channels. The result is processed with a single channel DFE with 32 feed forward coefficients and 16 feedback coefficients for all the packets. For the matched filtered data, the effective system impulse response is the Q function. Three examples of the Q functions sampled over the beginning, middle and end of the data are shown in FIG. 13. All three examples have STPR ≈0.2 (or PTSR ≈7 dB).

The processing results are shown in FIG. 14 for the BER, MSE, output SNR and percentage of update. The average BER is about 0.2%. The average MSE is about −8.5 dB and the average output SNR is about 8 dB. The average MSE and output SNR is about 2 dB worse than the conventional DFE. Performance can be worse or better for the DFE of the invention compared with the conventional DFE depending on the number of the receiver channels used.

FIG. 14 demonstrates that the DFE of the invention requires, on the average, only a 10% update rate as compared with the 99.8% update rate of the conventional DFE. This is consistent with the fact (see FIG. 11) that the channel has an intra-packet coherence value ~0.9.) The low update rate means savings in numerical computations.

Figure 15:
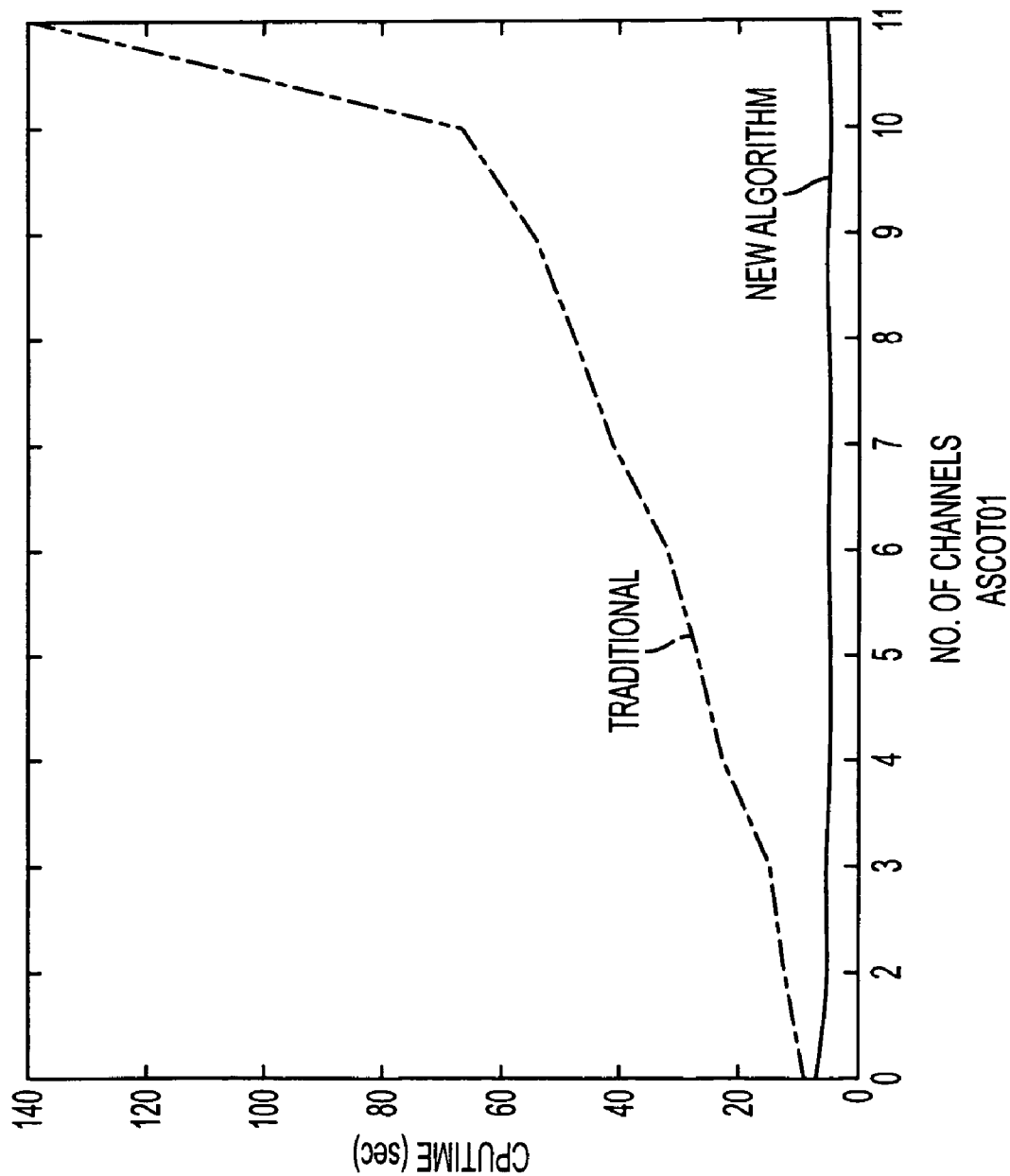
FIG. 15 plots the CPU time used by a prior art ("traditional") DFE versus a DFE according to the invention as a function of the number of receivers.

FIG. 15 demonstrates the reduction in the computational complexity for the DFE of the invention compared with the conventional DFE. FIG. 15 plots the CPU time used by the conventional DFE versus the DFE of the invention as a function of the number of receivers. The number was estimated using the ASCOT 01 data. The savings in computations is quite significant when a large number of receivers are available. Note for example, that the CPU time for the conventional DFE increases by a factor >6 when the number of receiver channels increases from 1 to 10 and beyond. The CPU time for the DFE of the invention remains approximately a constant irrespective of the number of receivers used. FIG. 15 shows a slight decrease in CPU time for the DFE of the invention, as the number of receivers increases. This can be explained by the fact that the variance of the symbol phase fluctuation decreases with the number of receiver channels. The PLL requires less update and thus less CPU time.

Data Analysis: Moving Source and Fixed Receivers

The previous section showed that the correlation-based DFE yields approximately the same results as the conventional multi-channel sparse DFE for a fixed source and fixed receivers. It has the simplicity of a single channel DFE algorithm with a small number (48 total) of taps coefficients, yielding significant savings in computational requirements. The average uncoded BER increases by ~0.1%. (Note that since error coding is normally required in practice, the slight increase in BER is not an issue.)

The other advantages of the correlation-based DFE are robustness and reliability for moving source/receivers, and applicability to a wide variety of shallow waters. Data was collected during the RDS3 experiment in the Adriatic Sea. The Adriatic Sea presents a different propagation condition (a different multipath arrival structure) than the Massachusetts Bay. Despite the difference, the correlation-based DFE still uses a total of 48 tap coefficients (32 feed forward coefficients and 16 feedback coefficients).

For the data analyzed here, the source was towed at a depth of ~10 m at a speed of ~4 knots. Identical BPSK signals as described above were transmitted. The receiver array consisted of 16 phones with uneven spacing, covering a depth of 35-61 m. The receiver array was deployed from an anchored ship. The channel impulse response was shown above in FIG. 7 corresponding to a source-receiver range between 2 and 7 km.

The moving source data introduce additional complexities due to carrier frequency Doppler shift and symbol synchronization errors caused by signal dilatation/compression. Doppler processing of the moving source data plays a pivotal role in determining the BER and deserves a detailed treatment. The conventional approach estimates the Doppler shift using (random) training data. The known training sequence is re-sampled according to anticipated Doppler shift and correlated with the received data to produce an ambiguity surface as a function of the Doppler shift and multipath delay time. The peak of the surface reveals the Doppler shift at the beginning of the transmitted data. The data are then re-sampled using the estimated Doppler shift to correct for the symbol dilation/compression. The above estimation procedure was found not to be robust in practice. Often, the Doppler shift estimated between different receivers can be off by an amount that is not physical. Also, the estimated Doppler shift between consecutive packets can be significantly different. The reason is due to the poor frequency resolution of a random signal, which is of the order of the inverse of the time span of the training sequence (~1 sec or less). Normally it is not good enough. An arbitrary random number sequence is net ideal for Doppler estimation.

The other difficulty in Doppler processing is that the Doppler shift is often varying with time even within a packet. As a result, the adaptive tap coefficients must not only rotate to maintain carrier phase but also "advance or slip" to synchronize with the time varying symbol timing. Acceptable performance requires that the feed-forward coefficients have sufficient spatial span to accommodate for the Doppler variation within a packet. Likewise, Doppler estimation error and path length fluctuations over the packet duration will also cause the equalizer taps to "rotate and drift".

Figure 16:
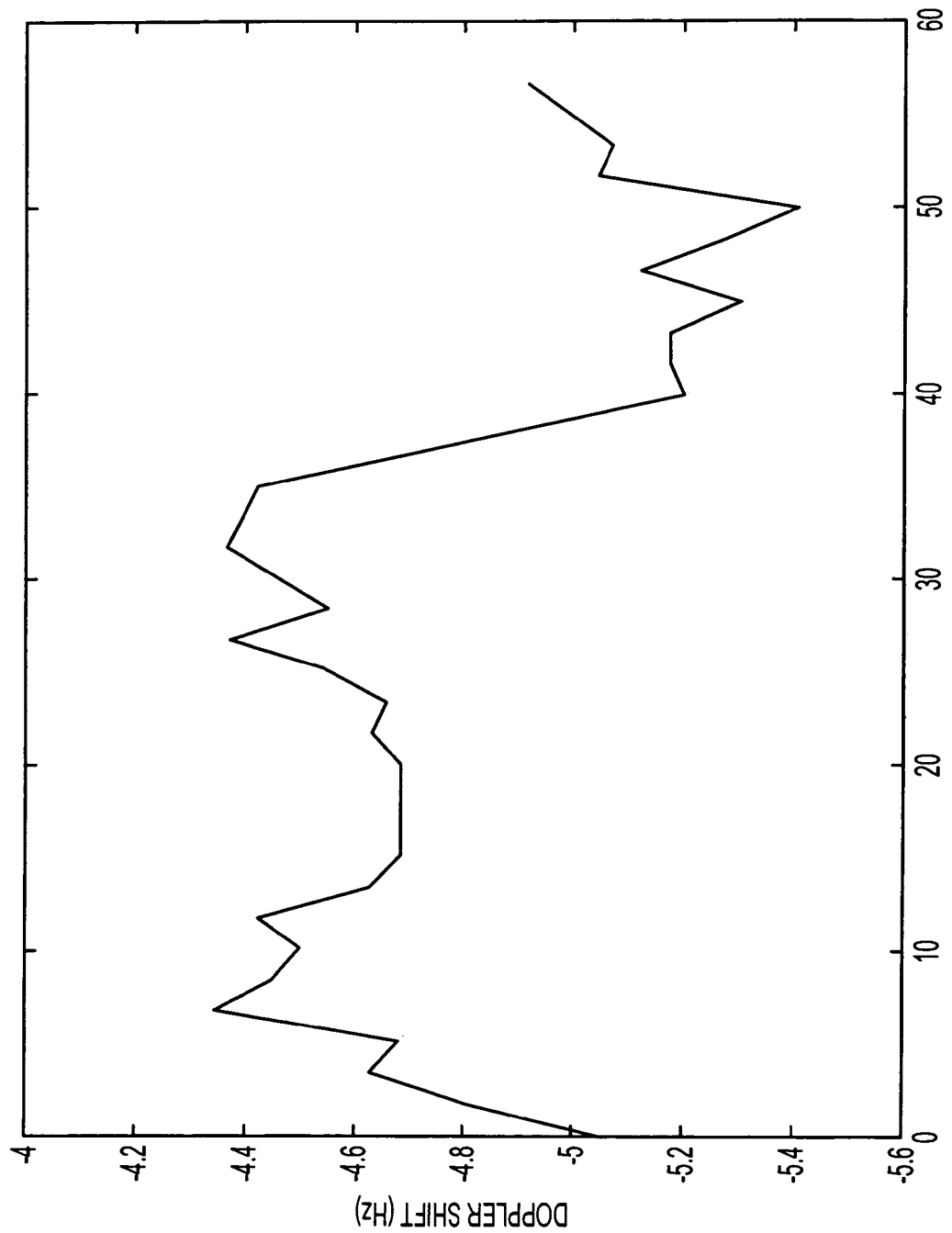
FIG. 16 shows the mean Doppler shift for each packet as a function of the packet transmission time (geo-time) for a single channel for a DFE according to the invention.
Figure 17B:
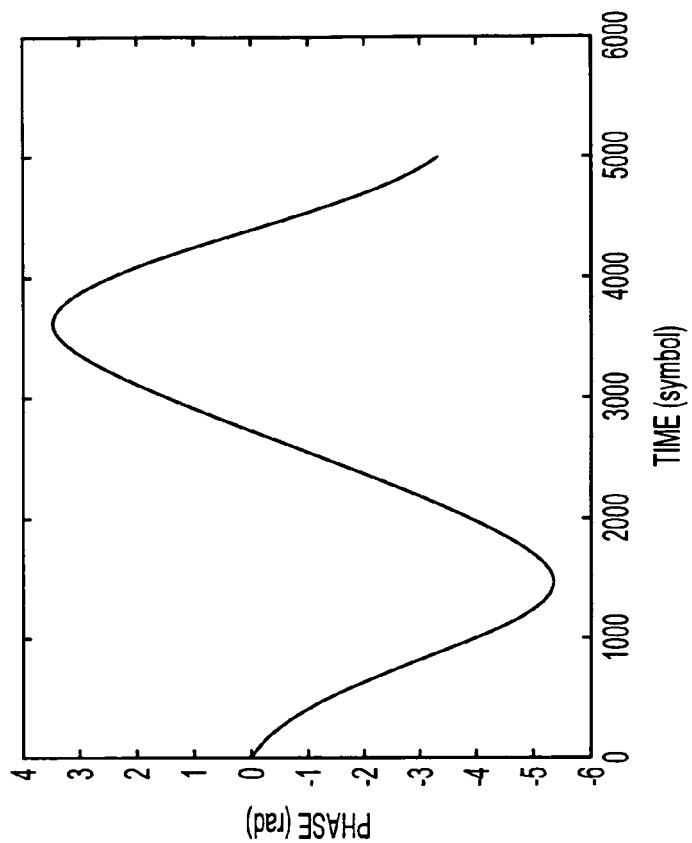
FIGS. 17a-b plot the Doppler variation within a particular packet (intra-packet variation) for 7 receiver channels for a DFE according to the invention.
Figure 17A:
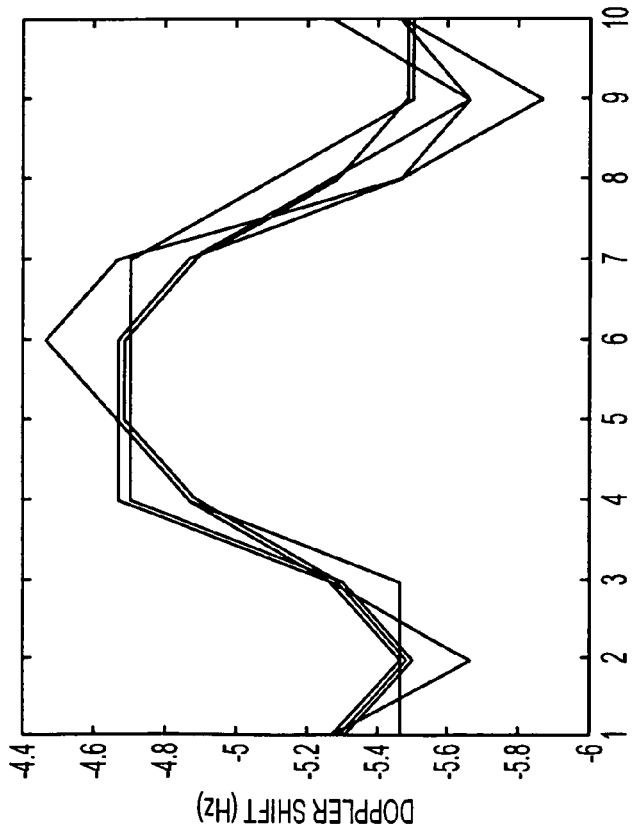

For each packet, the mean Doppler shift (across the packet) was measured based on the signal time dilation. The signal transmitted during the RDS3 Experiment contained a LFM placed 0.3 sec before the probe signal and 0.3 sec after the end of the message data. The time separation between the two LFM signals was measured by cross-correlating the data with the transmitted LFM. The ratio of the measured time separation over the transmitted time separation provided the mean Doppler ratio, from which the mean Doppler shift was determined. The mean Doppler ratio was used to decimate and sample the data by a simple symbol time mapping procedure. FIG. 16 shows the mean Doppler shift for each packet as a function of the packet transmission time (geo-time) for a single channel. A Doppler shift variation occurred of ±0.5 Hz. FIGS. 17a-b plot the Doppler variation within a particular packet (intra-packet variation) for 7 receiver channels. The intra-packet Doppler variation was measured using the ambiguity functions of the repeated m-sequences. One finds that the intra-packet Doppler variation is of the order of ±0.6 Hz. This Doppler variation is found occurring continuously in time with a period of approximately 6-8 sec, which is consistent with the ship heave motion induced by ocean waves. The ship motion is passed on to the tow body by the tow cable.

Note that a constant Doppler shift will induce a linear time-increasing phase for each symbol (which is removed by Doppler correction). A time-varying Doppler shift induces an additional time-varying phase component $$\phi(t) = \int_0^t (\Delta f(t) - \overline{\Delta}) dt$$

where $\overline{\Delta}$ is the mean Doppler shift across the packet. This phase can be calculated by interpolating the time-varying Doppler shift data (FIG. 17a) averaged over 7 receivers. The result is plotted in FIG. 17b. This time-varying phase will be compared with the phase determined by PLL below.

An hour of BPSK data was processed using the conventional DFE. Seven receivers at depths of 10, 12, 13.8, 14.9, 15.8, 17.6, and 21.1 m were used. They have the highest total energies, i.e., highest peak values for the auto-correlation functions (see FIG. 8b). FIG. 18 plots the results of the BER and percentage of update. Eleven packets have zero bit error. For the remaining 19 packets, 30-50% of the (total 5000) bits are in error. Note that for the data with zero BER, the conventional DFE requires >99% update rate. (The update rate is artificial when the DFE fails.)

The correlation-based DFE requires an accurate estimation of the (initial) channel impulse response function using the probe signal. The amplitude of the impulse response function is insensitive to the Doppler shift but its phase is very sensitive to the Doppler shift. A probe signal that is sensitive to Doppler shift, such as a m-sequence or a hyperbolic frequency modulated signal, is required for this purpose. A commonly used probe signal, such as the Barker code or linear frequency modulated signal, is found deficient for Doppler estimation. The Doppler sensitive signal can also be used as the training data thus eliminating the need for a probe signal. Doppler shift is estimated from the peak position of the broadband ambiguity surface (as a function of Doppler shift and multipath delay time) using a pre-determined set of Doppler shifted probe signals as the matched filters. The impulse response at the corresponding Doppler shift is used to correlate with the received data.

Note that for a time varying channel, which applies by definition to moving source/receiver data, the Q function is varying with time. The probe signal provides only an estimation of the Q function at the beginning of the packet. The temporal variation of the Q function will be processed by an adaptive DFE as done in conventional DFE.

Figure 19A:
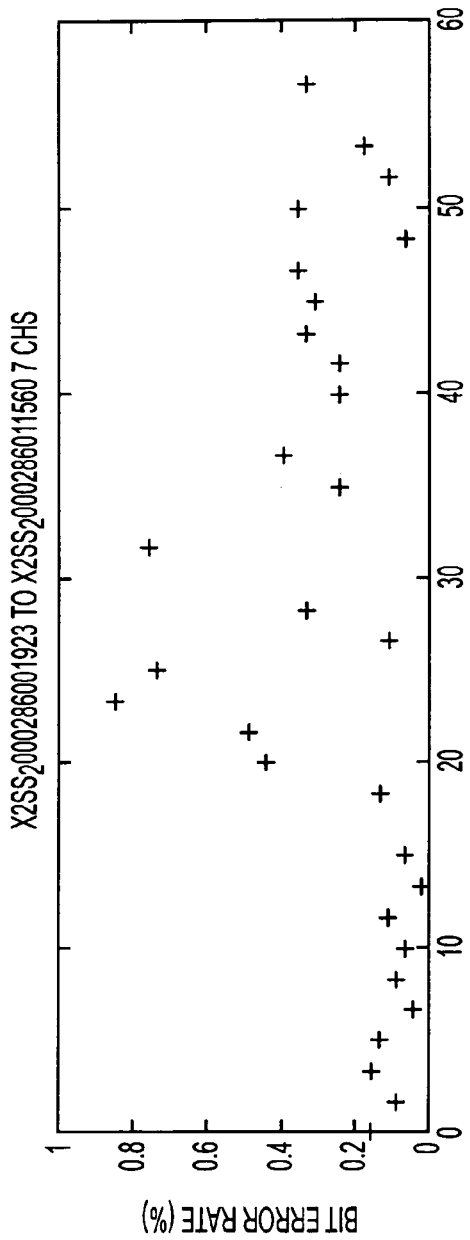
FIG. 19 plots the results of the BER and percentage of update for a DFE according to the invention.
Figure 19B:
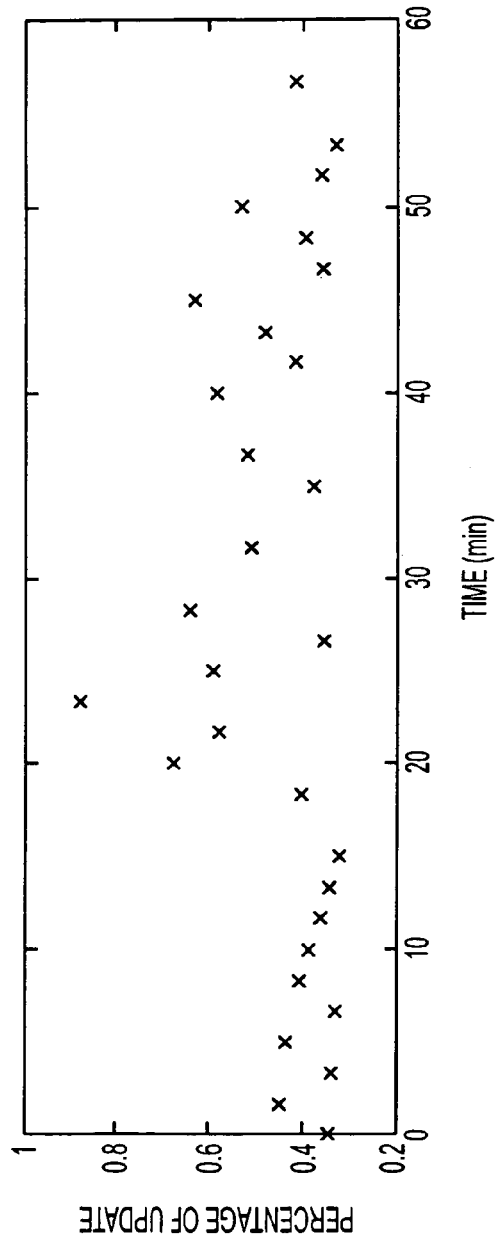
Figure 20A:
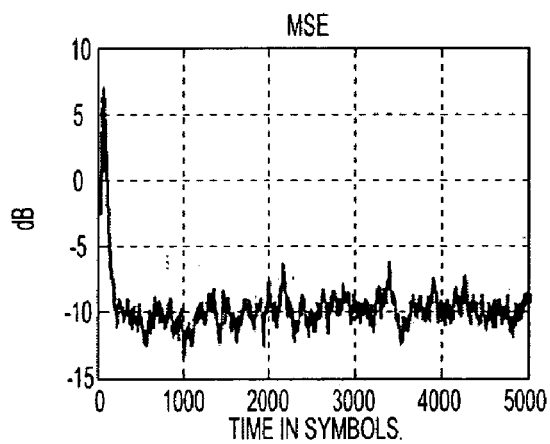
FIG. 20 plots the results for the first packet for a prior art DFE.
Figure 20B:
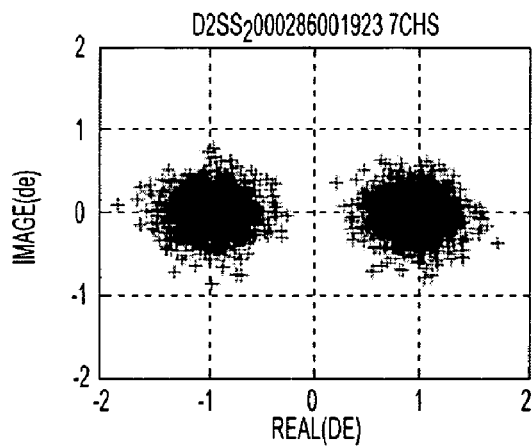
Figure 20C:
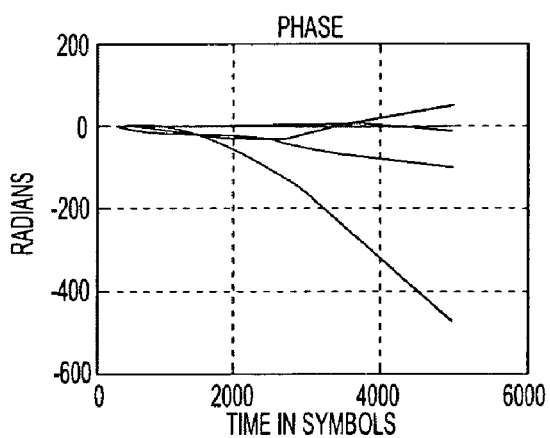
Figure 20D:
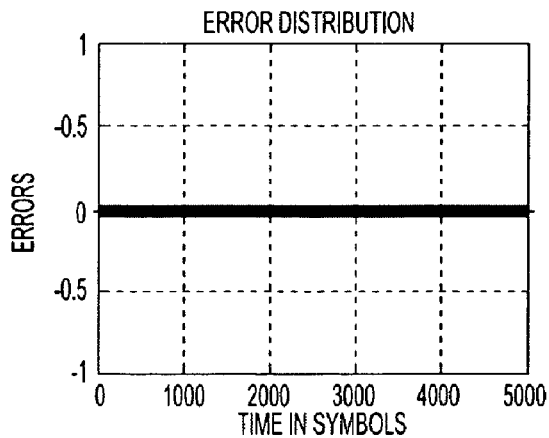

The results using the correlation-based DFE are plotted in FIG. 19 for comparison. All 30 packets have <1% BER with the majority having <0.5% BER. The majority of the data requires <60% update rate. Comparing FIG. 19 with FIG. 18, it is seen that none of the packets have zero bit error. Although the conventional DFE performs better (zero BER) when it works, the DFE of the invention is more robust—it achieves consistently <1% (uncoded) BER packet after packet. Using a reduced number (4-5) of receivers, BER was <1% except for two packets. More receivers are needed for the RDS3 data than the ASCOT01 data because of the longer time span of the auto-correlation function for RDS3 (~80 ms vs ~20 ms).

Performance Analysis

Figure 21:
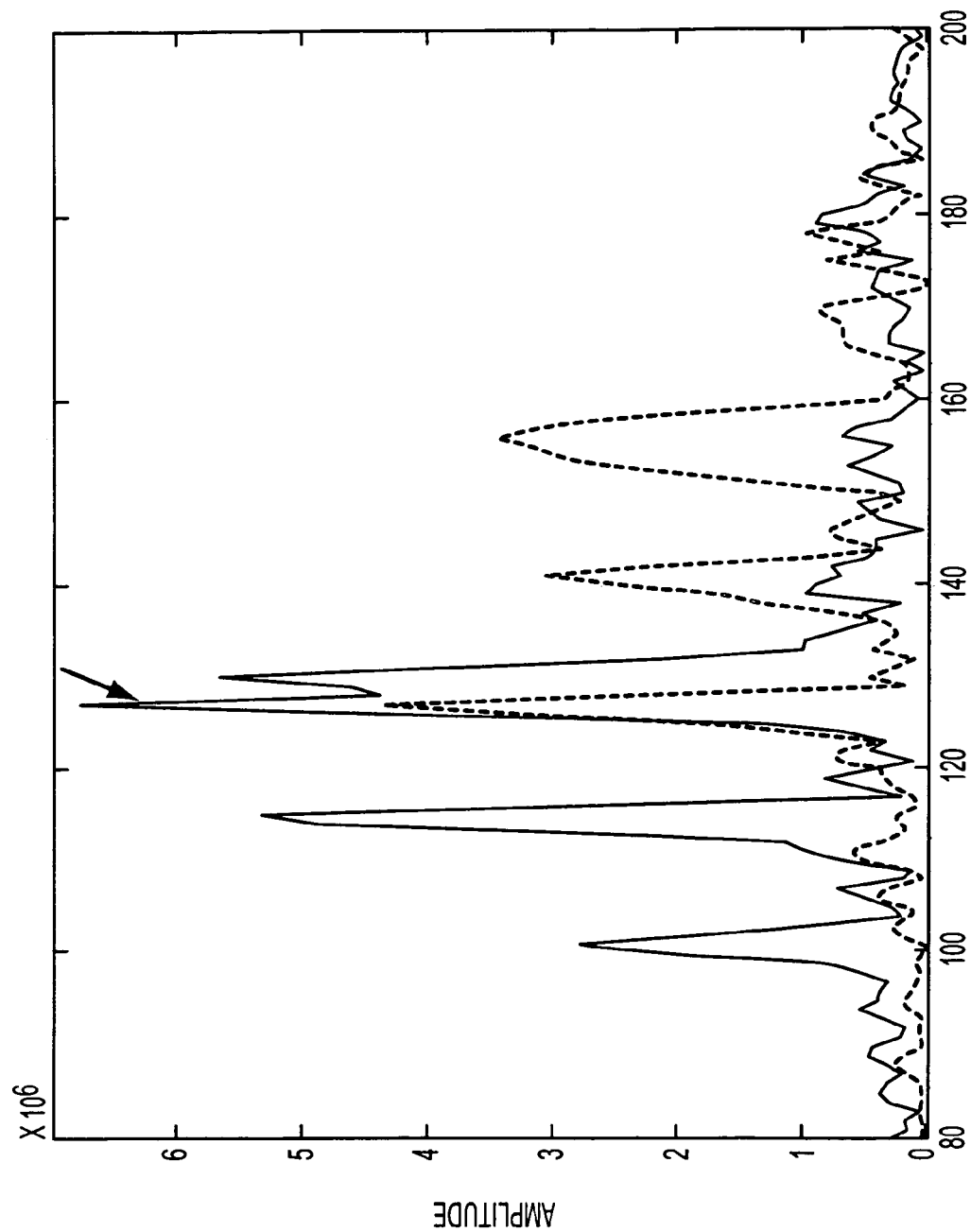
FIG. 21 plots the channel impulse responses for two receiver channels lined up by their peaks for a prior art DFE.
Figure 22A:
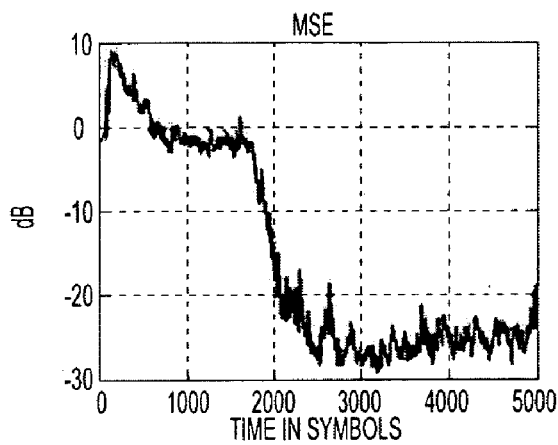
FIG. 22 plots the plots the conventional DFE results for a packet in the middle for a prior art DFE.
Figure 22B:
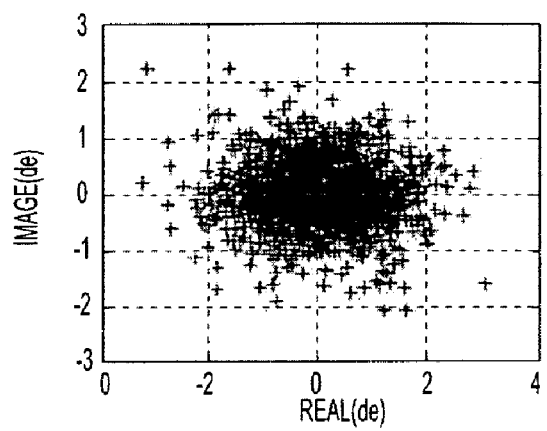
Figure 22C:
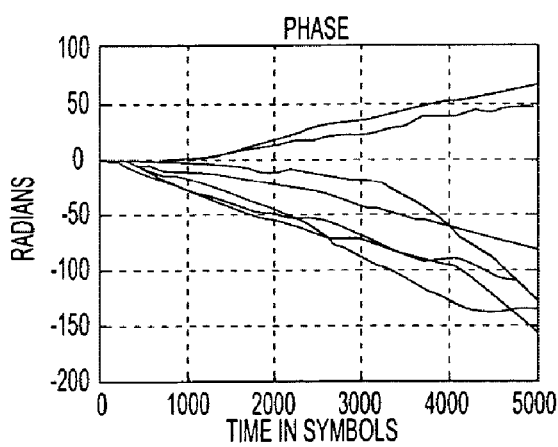
Figure 22D:
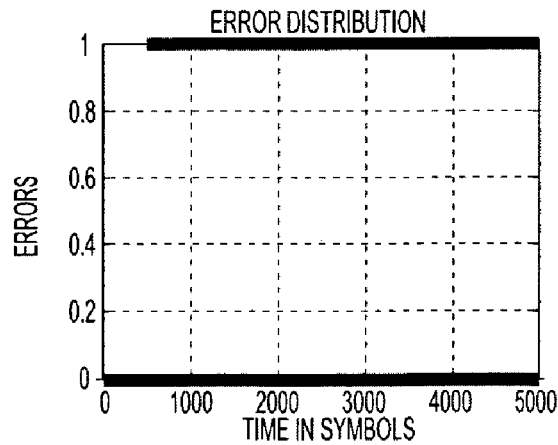

FIG. 20 plots the conventional DFE results for the first packet, which yields zero bit error. The average MSE is about −11 dB. The phase changes of individual channels obtained by PLL are also shown which will be discussed later. FIG. 21 plots the channel impulse responses for two receiver channels lined up by their peaks. (Recall the depth dependence of the channel impulse responses as shown in FIG. 8.) To determine the number of feed forward and feedback coefficients, a cursor is placed at the first peak of the channel impulse function, which lies within 2 dB from the main peak for each channel. The pre-cursor channel response determines the number of feed forward coefficients and the post-cursor channel responses determines the structure (number and delay) of the sparse feedback coefficients. The cursor position is marked by an arrow in FIG. 21. FIG. 21 shows that one channel impulse response is predominantly a minimum-phase channel, whereas, the other impulse response is predominantly a maximum-phase channel. The data were processed using 16 feed forward coefficients (8 symbols), which basically ignored the first weak arrival at arrival time 100 in FIG. 23.

Figure 23:
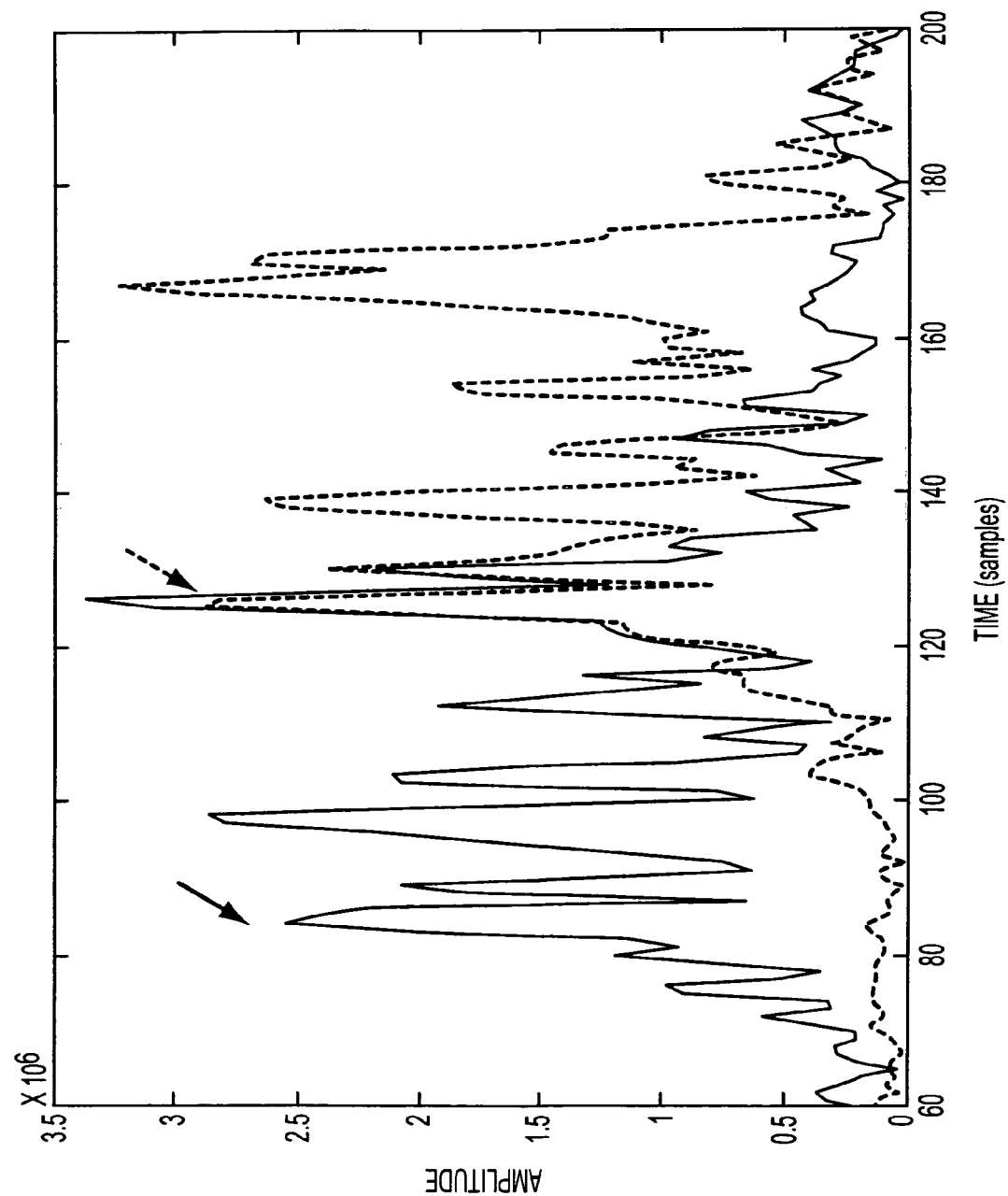
FIG. 23 plots the channel impulse response functions for two receiver channels for a prior art DFE.
Figure 24A:
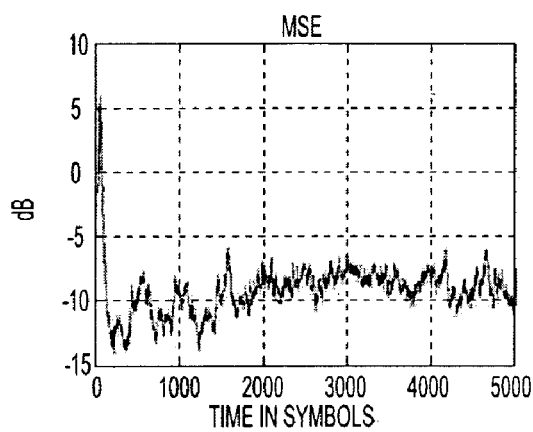
FIG. 24 plots the correlation-based DFE results for the first packet for a DFE according to the invention.
Figure 24B:
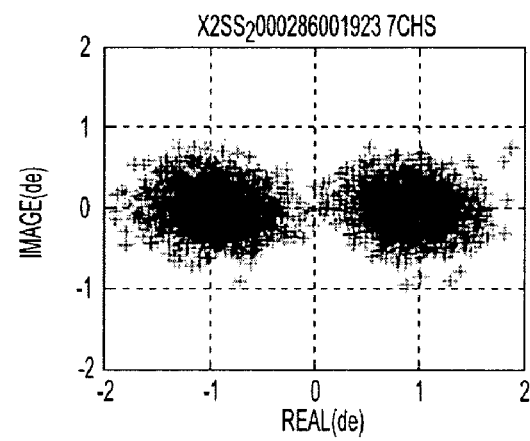
Figure 24C:
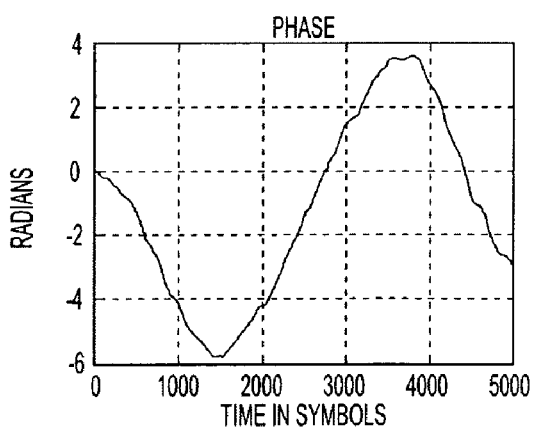
Figure 24D:
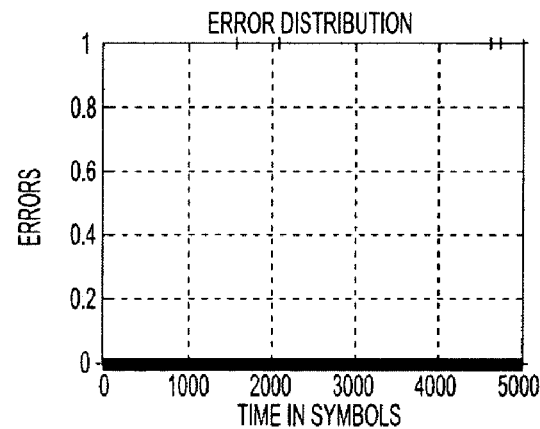

FIG. 22 plots the conventional DFE results for a packet in the middle, which yields ~50% BER (see the error distribution subplot). The conventional DFE never converges even during the training phase; the MSE was at best −2 dB before it locked into an artificial mode as indicated by the sudden drop in the MSE around symbol 2000. FIG. 23 plots the channel impulse response functions for two receiver channels. Both channel impulse responses have non-minimum phase with a latter arrival having the strongest amplitude. For the channel designated by the dashed curve, the cursor is placed at the first peak which lies within ~2 dB from the main peak. For the other channel (thin solid curve), searches for the first peak which lies within ~2 dB from the main peak found none but the main peak itself, which is indicated by the dashed error. If the search range (from the main peak) is changed from 2 to 3 dB, the cursor lands on the first peak as indicated by, the solid arrow. Consider the latter case first (where the cursor is placed on the first peak for both channels). One needs 6 feed forward coefficients and 25 feedback coefficients (25 symbols). The problem here is that the late arrivals of previous symbols are greater than the first arrival of the current symbol and interferes with the decision of the current symbol (the maximum-phase problem), which the conventional DFE is known to have difficulty. This is the case of interference dominating over data. In this case, error comes from the feedback loop, which can cause incorrect decision of the (current) symbol. Considering the former case, one channel has the (maximum-phase) interference problem and the other channel requires ~45 feed forward coefficients. There is also the third case, where the cursor is placed at the main peak for both channels; both require 45 feed forward coefficients and approximately zero feedback coefficients. This last case corresponds to basically a linear equalizer, which does not work very well here; the error in this case originates from the feed forward loop. The mixed case has errors coming from both the feed forward and feedback loops. All three cases result in ~50% BER.

This contrasts with the results using the correlation-based DFE. A m-sequence is used as a probe signal which provides a good estimate of the Doppler shift. FIG. 24 plots the correlation-based DFE results for the first packet, which yields 4 bit errors out of 4500 bits. The average MSE starts at −11 dB and then degrades to −8 dB. FIG. 25 plots the equivalent channel impulse response (the Q function) for 7 channels. The STPL is about 0.25. It can be equalized by 32 feed forward coefficients and 16 feedback coefficients.

Figure 26:
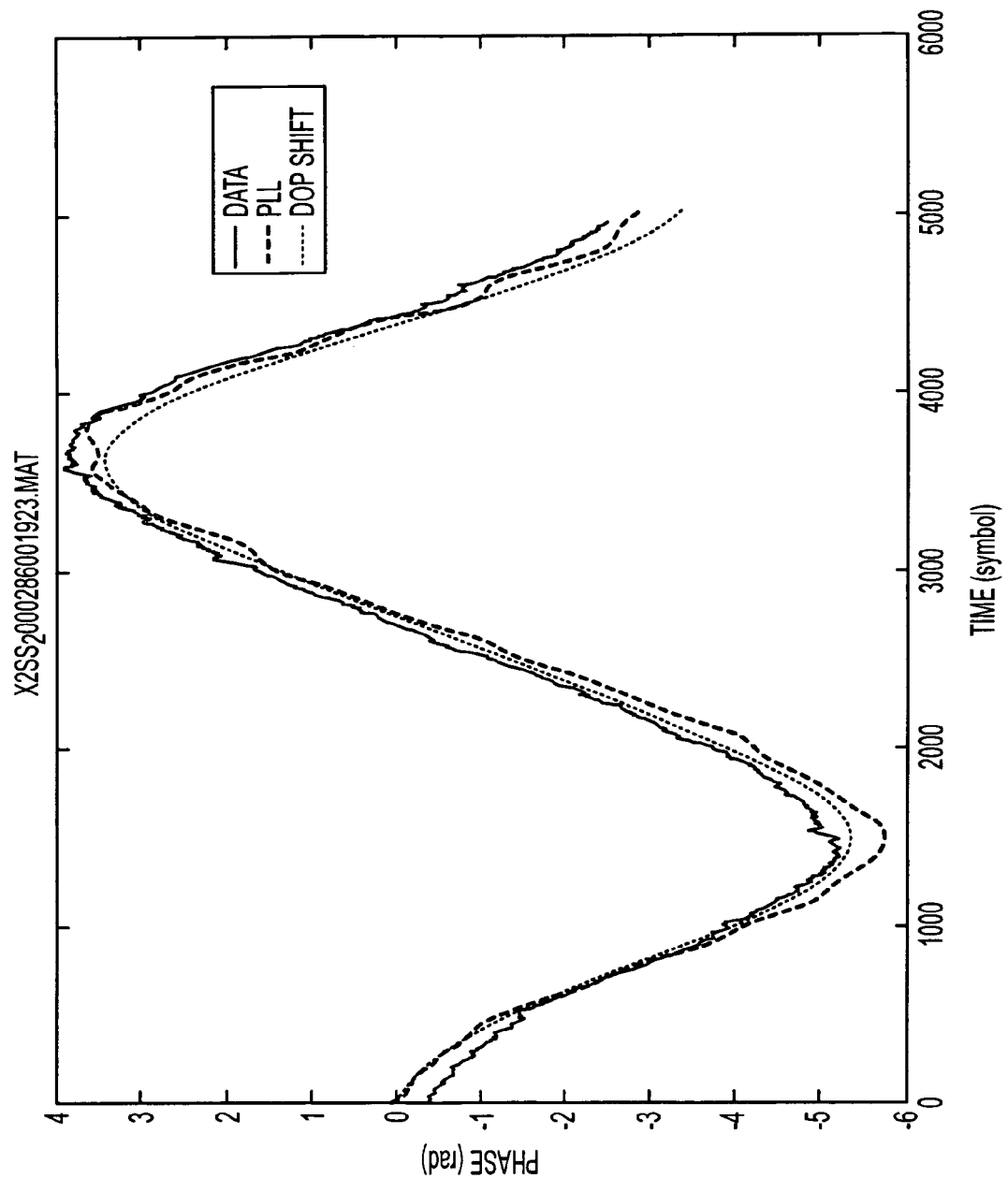
FIG. 26 re-plots the phase produced by the PLL shown in FIG. 26 as the dashed curve and plots the measured phase as the solid line for a DFE according to the invention.

The phase produced by the PLL for the channel equalizer of this invention (lower left plot of FIG. 24) is re-plotted in FIG. 26 as the dashed curve. This phase will be compared with the "true" symbol phase measured from the matched filtered (passive-phase conjugated) data. The passive-phase conjugated data can be represented by $r_k = I_k e^{j(\Delta f)kT} + \eta_k$ in the absence of ISI, where $\Delta f$ is Doppler shift, T is the symbol period, $I_k = \pm 1$, and $\eta_k$ is the noise. The symbol phase drift, $(\Delta f)kT$, can be measured by squaring $|r_k|^2$ in which $|I_k|^2 = 1$. In the presence of residual ISI, $|r_k|^2$ is averaged over many symbols to remove the phase ambiguity associated with $I_k$ including ISI. Averaging over 64 symbols, the measured phase is plotted in FIG. 26 as the solid line. There is very good agreement between this phase and the phase correction used by the PLL. The dotted line in FIG. 26 is a re-plot of the phase obtained before (FIGS. 17a-b) based on the measured Doppler shift averaged over seven receivers. One finds good agreement between this phase curve and the other two phase curves.

The above results suggest that the symbol phase drift is indeed caused by the time-varying Doppler shift within the packet. Now, comparing FIG. 26 with FIG. 20, it can be seen that the phase corrections produced by PLL in FIG. 20 bear no relation at all to the "true" symbol phase drift in the data. The above observations are generally true for other packets as well.

Figure 27:
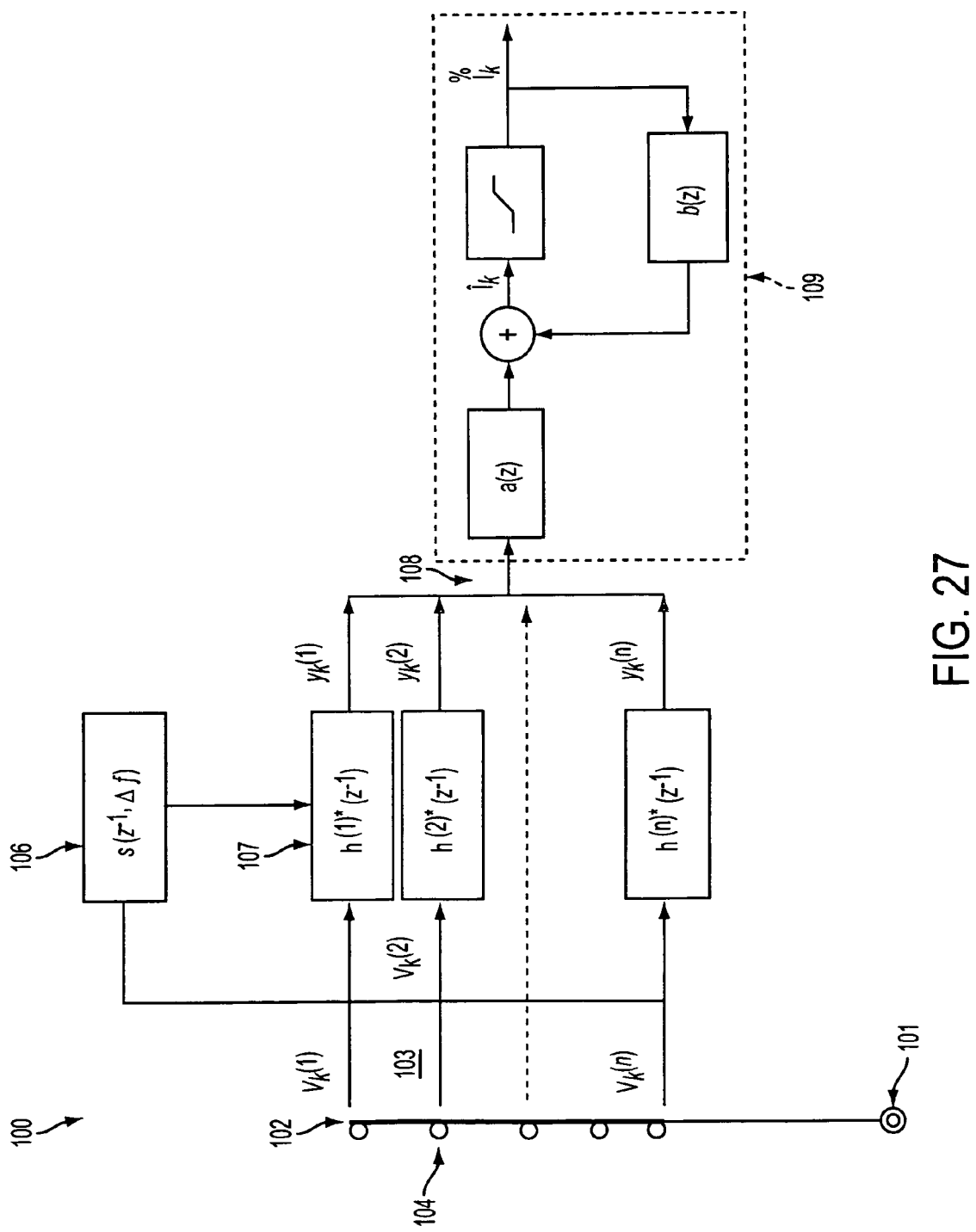
FIG. 27 is a block diagram of an underwater communications system including a DFE according to the invention.

Referring now to FIG. 27, an underwater two-way acoustic communications system 100 includes an antenna array 102 for receiving sound transmissions and a source 101 for transmitting sound. Antenna array 102 includes a plurality of sensors 104, e.g. hydrophones, spaced as desired. In a receiving mode, a probe signal is detected (using e.g. a correlation processor) from the signal 103 received by antenna array 102 and routed to a correlation processor 106 that processes the probe signal (or training data) using a matched filter based on a set of pre-calculated Doppler-shifted probe signal waveforms within an anticipated range of Doppler shift. Doppler shift is estimated from the peak position of the broadband ambiguity surface as a function of Doppler shift and delay time (the matched filter output). The channel impulse response at the corresponding Doppler shifted frequency is determined. The signal 103 from the antenna array is further processed by correlating the signal 103 with the Doppler-corrected channel impulse response function 107 for each receiver channel. The outputs are summed over the receiver channel 108 and processed with a single channel DFE 109 in accordance with the invention as discussed in more detail above.

In summary:

(1) The invention provides a DFE that uses approximately the same number of feed forward and feedback tap coefficients, normally a total of <50, for all shallow water. This is based on an approximate "universal" property of the Q function, which remains stable (STPR ~<0.2) despite the differences in sound speed profiles prevalent in different oceans, the temporal variations of the channel impulse response functions due to the ocean random media, the changes in the channel impulse responses due to source/receiving changing range and depth.

(2) Using a single channel DFE, the invention reduces significantly the computational complexity of the processor compared with a multi-channel DFE of the prior art.

(3) Spatial diversity employing multiple uncorrelated receivers is normally required to minimize the bit error rate (hence requiring a multi-channel DFE). The same number of spatial-diversity channels is preferably used for the DFE of the invention.

(4) Compared with passive-phase conjugation, fewer receivers are required. The residue ISI is removed by DFE.

(5) Temporal variation of the communication channel is preferably updated using an adaptive (recursive least square) channel as in conventional DFE.

(6) The DFE of the invention applies equally to minimum phase or maximum phase channels without algorithm change.

(7) Signals received on different elements of the receiver antenna can endure significant delays between the channels causing errors in channel synchronization. Signals are automatically synchronized using the invention.

(8) The processor uses a Doppler-corrected impulse response for each channel. A Doppler-sensitive probe signal (or training sequence) is used for an accurate estimation of the Doppler shift.

(9) For the invention, Doppler-induced symbol phase can be successfully removed from the data allowing the DFE to focus on updating the channel impulse response functions.

(10) Removing the mean Doppler shift from the data is preferred so that PLL can take care of the residual (time-varying) Doppler-induced phase change. For the data studied above, the residual Doppler shift was equal to or less than ±0.5 Hz. The PLL can (accurately) remove the time-varying residual Doppler phase shift if the residual Doppler shift is <20% of the average Doppler shift (or the variation of the platform speed <20% of the average speed).

Obviously many modifications and variations of the present invention are possible in the light of the above teachings. It is therefore to be understood that the scope of the invention should be determined by referring to the following appended claims.

I claim:

1. An underwater communications system, comprising:

an antenna array including a plurality of sensors for receiving sound transmissions;
a sound transmission source for transmitting communication packets, said packets containing a Doppler-sensitive probe signal followed by a gap, followed by a sequence of symbols beginning with training symbols followed by message symbols, wherein said probe signal can be a stand alone signal or part of said training sequence;
a receiver including a processor, said processor programmed
(i) for receiving and detecting said Doppler-sensitive probe signal or said training sequence for each of a plurality of receiver channels;
(ii) for estimating the channel impulse response function using a matched filter based on a set of Doppler-shifted probe signal waveforms within an anticipated range of Doppler shift for each of a plurality of receiver channels, thereby determining a broadband ambiguity surface as a function of Doppler shift and multipath delay time for each of a plurality of receiver channels, and determining the Doppler-shift from the peak position of the ambiguity surface and a Doppler-corrected impulse response function for each of a plurality of receiver channels;
(iii) for correlating the received signal after the probe signal with the Doppler-corrected impulse response function for each of a plurality of receiver channels to yield a plurality of processed channel outputs, and
(iv) for summing the channel outputs to yield a common receiver output; and
a Decision Feedback Equalizer (DFE) applied to said common receiver output to adaptively correct for the inter-symbol interference and retrieve the transmitted communication message.

2. An underwater communications system as in claim 1, wherein the DFE has an auto-correlation function defined by $$I_k = y_k - \sum_{n=1}^{L} x_n I_{k-n} - \sum_{n=1}^{L} x_n^* I_{k+n} + N_0$$

where $$N_0 = \sum_{j=1}^{J} \sum_{l=0}^{L} h_{j,l}^* \eta_{j,k-l}$$

is a noise term, $\{y_k\}$ and $\{x_k\}$ are defined as $$y_k = \sum_{j=1}^{J} \sum_{l=0}^{L} h_{j,l}^* v_{j,k-l}$$

and $$x_n = \sum_{j=1}^{J} \sum_{l=1}^{L-n} h_{j,l}^* h_{j,l+n},$$

and J is the number of receivers.

3. An underwater communications system as in claim 1, further comprising an adaptive recursive least square channel for updating temporal variation of the communications system.

4. An underwater communications system as in claim 1, wherein said processor further removes Doppler-induced symbol phase from said packets.

5. An underwater communications system as in claim 1, wherein said processor further removes a mean Doppler shift from said packets based on the time delay between two probe signals when the true time delay is known.

6. A method of underwater communications, comprising:
receiving sound transmissions;
detecting a probe signal from said sound transmissions;
routing said probe signal to a correlation processor;
processing the probe signal using a matched filter based on a set of pre-calculated Doppler-shifted probe signal waveforms within an anticipated range of Doppler shift;
estimating a Doppler shift from the matched filter output in the form of a broadband ambiguity surface as a fuction of Doppler shift and multipath delay time;
estimating the channel impulse response from the corresponding matched filter output at the estimated Doppler-shift;
correlating the received signal following the probe signal with a Doppler-corrected channel impulse response function for each of a plurality of receiver channels to generate a plurality of channel outputs;
summing the channel outputs; and
processing the summed channel outputs with a DFE.

7. A method of underwater communications as in claim 6, wherein the DFE has an auto-correlation function defined by $$I_k = y_k - \sum_{n=1}^{L} x_n I_{k-n} - \sum_{n=1}^{L} x_n^* I_{k+n} + N_0$$

where $$N_0 = \sum_{j=1}^{J} \sum_{l=0}^{L} h_{j,l}^* \eta_{j,k-l}$$

is a noise term, $\{y_k\}$ and $\{x_k\}$ are defined as $$y_k = \sum_{j=1}^{J} \sum_{l=0}^{L} h_{j,l}^* v_{j,k-l}$$

and $$x_n = \sum_{j=1}^{J} \sum_{l=1}^{L-n} h_{j,l}^* h_{j,l+n},$$

and J is the number of receivers.

8. A method of underwater communications as in claim 6, further comprising updating temporal variation of the communications system with an adaptive recursive least square channel.

9. A method of underwater communications as in claim 6, further comprising removing Doppler-induced symbol phase from said probe signal.

10. A method of underwater communications as in claim 6, further comprising removing a mean Doppler shift from said probe signal.

* * * * *